United States Patent
Bento et al.

(10) Patent No.: US 6,478,049 B2
(45) Date of Patent: Nov. 12, 2002

(54) DOUBLE VALVE WITH ANTI-TIEDOWN CAPABILITY

(75) Inventors: Jose Carlos Bento, Sao Paulo (BR); C. Brian Wolfe, Lavonia, GA (US); Neil E. Russell, Bloomfield Hills, MI (US)

(73) Assignee: Ross Operating Valve Company, Troy, MI (US)

( * ) Notice: Subject to any disclaimer, the term of this patent is extended or adjusted under 35 U.S.C. 154(b) by 0 days.

(21) Appl. No.: 09/849,447

(22) Filed: May 4, 2001

(65) Prior Publication Data

US 2002/0007855 A1 Jan. 24, 2002

Related U.S. Application Data

(63) Continuation-in-part of application No. 09/574,513, filed on May 19, 2000, now Pat. No. 6,318,396, which is a division of application No. 09/330,937, filed on Jun. 11, 1999, now Pat. No. 6,155,293, which is a continuation-in-part of application No. 08/770,878, filed on Dec. 20, 1996, now Pat. No. 5,927,324.
(60) Provisional application No. 60/033,016, filed on Dec. 16, 1996.

(51) Int. Cl.[7] .................................................. F15B 20/00
(52) U.S. Cl. ..................................... 137/596.16; 91/424
(58) Field of Search ........................ 91/424; 137/596.16

(56) References Cited

U.S. PATENT DOCUMENTS

| | | |
|---|---|---|
| 1,290,865 A | 1/1919 | Anthony |
| 2,051,732 A | 8/1936 | McKee |
| 2,593,564 A | 4/1952 | Ives |
| 2,906,246 A | 9/1959 | Tirro et al. |
| 2,954,009 A | 9/1960 | Jullfs |
| 2,995,141 A | 8/1961 | Hipp |
| 3,139,109 A | 6/1964 | Ruchser |
| 3,280,951 A | 10/1966 | Jordan |
| 3,371,759 A | 3/1968 | Sapolsky |
| 3,670,767 A | 6/1972 | Mahorney |
| 3,757,818 A | 9/1973 | Sweet |
| 3,834,621 A | 9/1974 | Pacht et al. |
| 3,858,606 A | 1/1975 | Cameron |

(List continued on next page.)

FOREIGN PATENT DOCUMENTS

| | | |
|---|---|---|
| DE | 1099294 | 8/1961 |
| DE | 38890 | 8/1965 |
| DE | 41174 | 11/1965 |
| DE | 2750895 A1 | 5/1979 |
| DE | 3032336 A1 | 3/1981 |
| DE | 1 249 040 | 9/1986 |
| DE | 86 12453 | 9/1986 |
| DE | 90 14 789 | 3/1991 |
| EP | 97 12 0203 | 3/1998 |
| GB | 1294747 | 11/1972 |
| GB | 2010448 A | 6/1979 |
| GB | 2057638 A | 4/1981 |

*Primary Examiner*—Gerald A. Michalsky
(74) *Attorney, Agent, or Firm*—Harness, Dickey & Pierce, P.L.C.

(57) ABSTRACT

A control valve system having housing defining an inlet, an outlet and an exhaust. A first passage extends between the inlet and the outlet and a second passage extends between the outlet and the exhaust. A first plurality of valves are disposed within the first passage, each being selectively actuated to close, open, or partially open the first passage. A second plurality of valves are disposed within the second passage, each being selectively actuated to close, open, or partially open the second passage. A plurality of reset members are selectively engageable with the first plurality of valves and are operable to actuate the first plurality of valves when a pressure is applied to the plurality of reset members. The plurality of reset members each have an anti-tiedown stem extending therefrom to prevent operation of the control valve system if any of the plurality of reset members is tied down.

16 Claims, 28 Drawing Sheets

U.S. PATENT DOCUMENTS

| | | |
|---|---|---|
| 4,075,928 A | 2/1978 | Bitonti |
| 4,181,148 A | 1/1980 | Russell et al. |
| RE30,403 E | 9/1980 | Bitonti |
| 4,257,455 A | 3/1981 | Cameron |
| 4,345,620 A | 8/1982 | Ruscher et al. |
| 4,353,392 A | 10/1982 | Ruscher et al. |
| RE31,161 E | 3/1983 | Mahareny |
| 4,542,767 A | 9/1985 | Thornton et al. |
| 4,903,727 A | 2/1990 | Motzer |
| 4,903,728 A | 2/1990 | Motzer |
| 4,903,729 A | 2/1990 | Motzer |
| 5,113,907 A | 5/1992 | Russell |
| 6,155,293 A * | 12/2000 | Haselden et al. ...... 137/596.16 |

* cited by examiner

DOUBLE VALVE WITH ANTI-TIEDOWN CAPABILITY

CROSS-REFERENCE TO RELATED APPLICATIONS

This application is a continuation-in-part of U.S. application Ser. No. 09/574,513, filed May 19, 2000, now U.S. Pat. No. 6,318,396, which is a division of U.S. application Ser. No. 09/330,937 filed on Jun. 11, 1999, now U.S. Pat. No. 6,155,293, which is a continuation-in-part of U.S. application Ser. No. 08/770,878, filed Dec. 20, 1996, now U.S. Pat. No. 5,927,324, which claims the benefit of U.S. Provisional Application No. 60/033,016, filed Dec. 16, 1996, the disclosures of which are incorporated herein by reference.

FIELD OF THE INVENTION

The present invention relates to a control valve. More particularly, the present invention relates to a dual poppet fluid control valve, which includes a combined inlet and sensing poppet and an anti-tiedown device that prevents the control valve from operating, if the control valve reset has been tied down.

BACKGROUND OF THE INVENTION

Machine tools of various types operate through a valving system, which interacts with a pneumatic, controlled clutch and/or brake assembly. For safety reasons, the control valves that are used to operate these machine tools require the operator to actuate two separate control signal applying contacts essentially simultaneously. This requirement of simultaneous application ensures that the operator will not have his hand near the moving components of the machine tool when an operating cycle is initiated. The two-control signal applying contacts can then be connected to the valving system that allows compressed air to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective.

Prior art electromagnetic valving systems which are utilized for the operation of machine tools meet these safety requirements through the use of a double valve assembly. The double valve assembly, includes two electromagnetic supply valves which are normally closed. Each of the supply valves is moved to an open position in response to an electrical control signal. The two supply valves are arranged in series with respect to the source of compressed air. The double valve assembly also includes two exhaust valves, which are normally open. Each exhaust valve is closed by a respective supply valve when it is opened. It is therefore necessary for the supply valves to be opened simultaneously otherwise, supply air will be exhausted from the system through one of the exhaust valves. The opening and closing of the valve units is monitored by sensing air pressures in the respective valve units and then comparing these two pressures. The monitoring and comparing of these two pressures is accomplished by using a single air cylinder that is separated into two chambers by a piston. The pressure in each valve unit is delivered to one of the chambers. Thus, unequal pressures in the valve units will cause movement of the normally static piston, which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler and less costly valving systems which both meet and exceed the safety performance requirements in force today as well as those proposed for the future.

SUMMARY OF THE INVENTION

The present invention provides the art with a control valve system having a housing defining an inlet, an outlet and an exhaust. A first passage extends between the inlet and the outlet and a second passage extends between the outlet and the exhaust. A first plurality of valves are disposed within the first passage, wherein each of the first plurality of valves are movable between a deactuated position where the first passage is closed, an actuated position where the first passage is open, and an intermediate position where the first passage is partially open. A second plurality of valves are disposed within the second passage, wherein each of the second plurality of valves are movable between a deactuated position where the second passage is open, an actuated position where the second passage is closed, and an intermediate position where the second passage is partially open. A plurality of reset members are selectively engageable with the first plurality of valves. The plurality of reset members are operable to move the first plurality of valves to the deactuated position when a pressure is applied to the plurality of reset members. The plurality of reset members each have an anti-tiedown stem extending therefrom to prevent operation of the control valve system if any of the plurality of reset members is tied down.

The above-described invention clearly meets the requirement that valving systems for more reliable, simpler, and less costly valving systems which both meet and exceed the safety performance requirements in force today as well as those proposed for the future. In some such systems, however, operators sometimes attempt to maintain the reset in an operating position in order to attempt to prevent the machine from locking out in response to a malfunction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
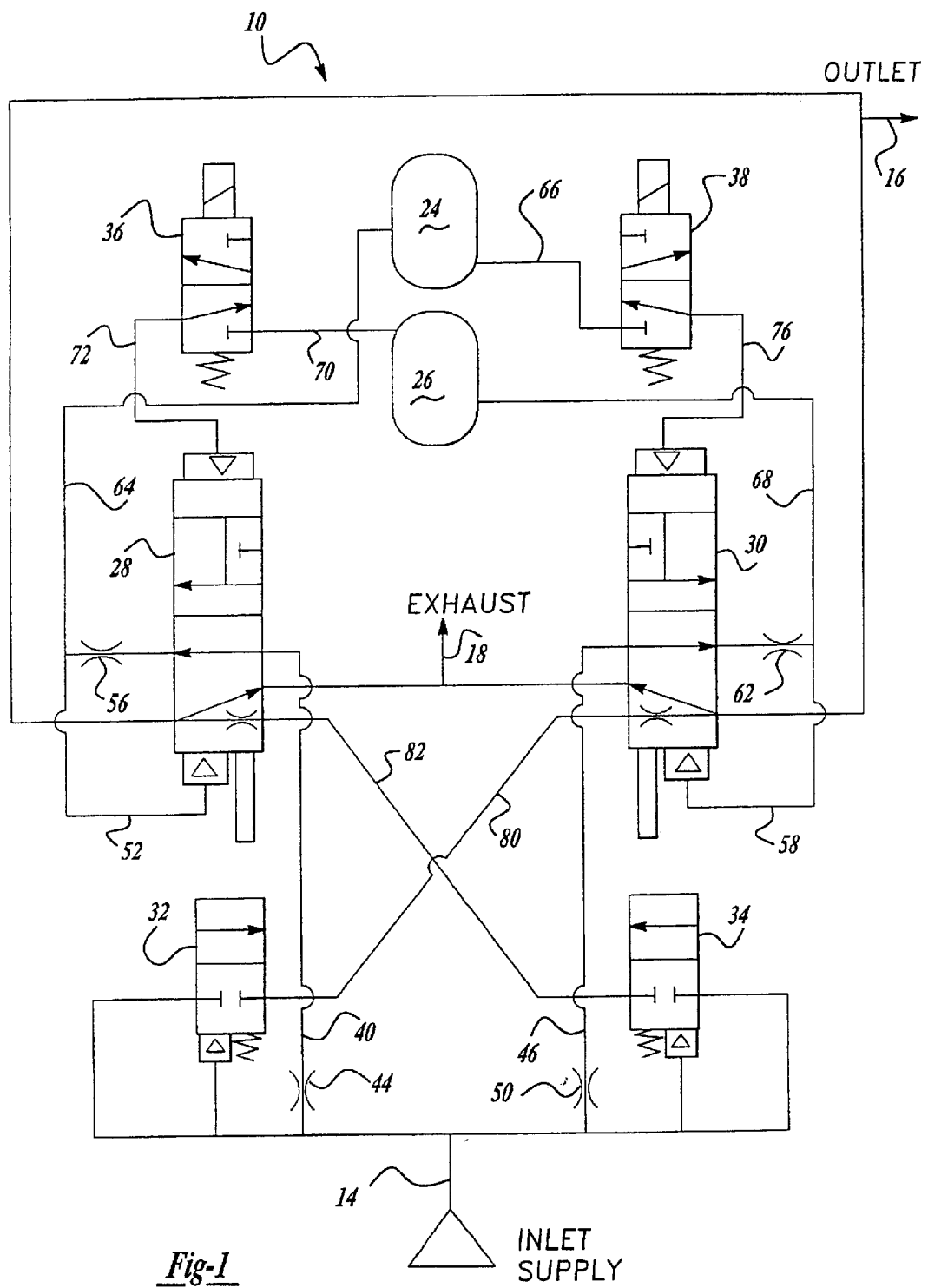
FIG. 1 is a schematic circuit diagram of a control valve system according to a first embodiment of the present invention shown in a deactuated position.
Figure 2:
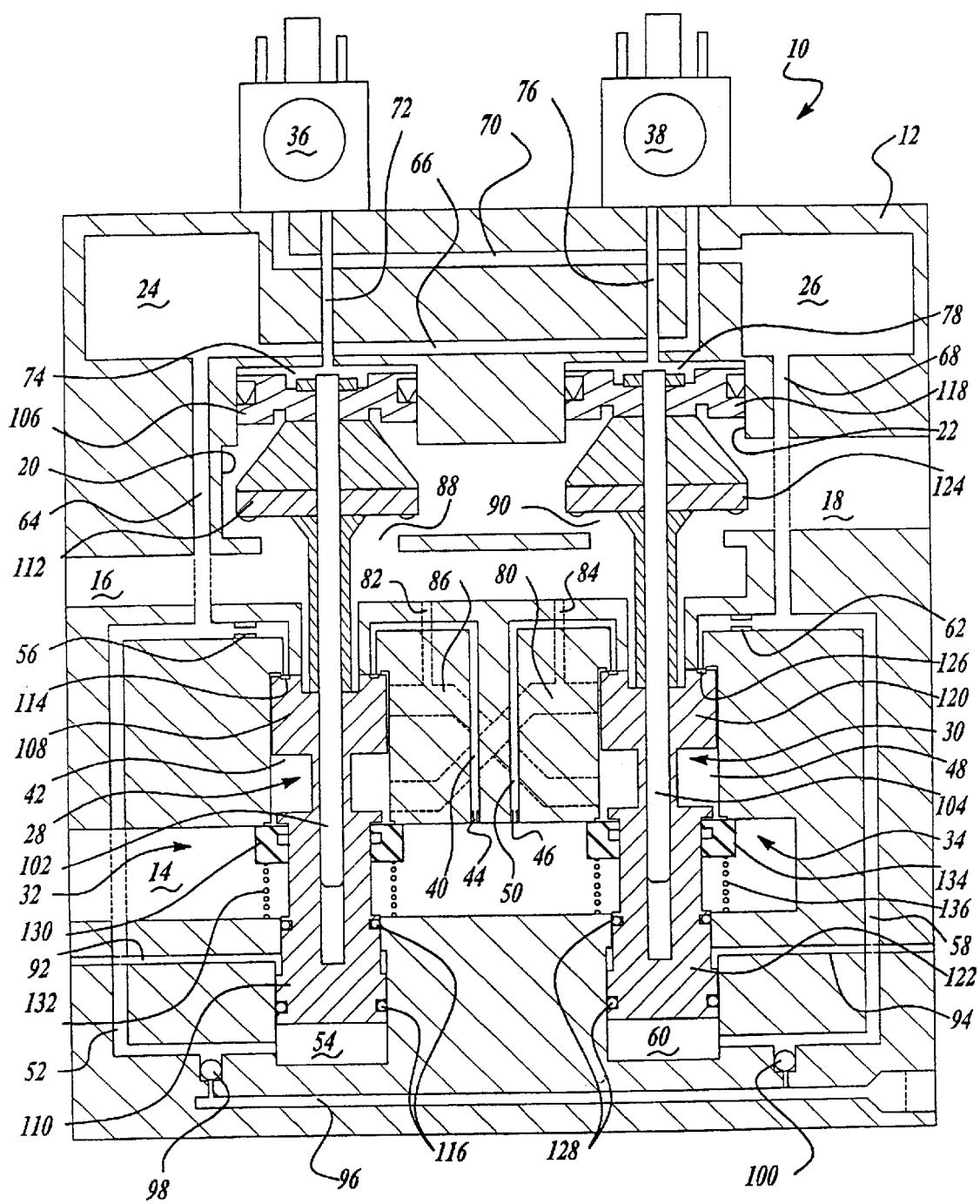
FIG. 2 is a schematic illustration of the control valve system shown in its deactuated position.

Referring now to the drawings in which like reference numerals designate like or corresponding parts throughout the several views, there is shown in FIGS. 1 and 2 a control valve system in accordance with the present invention which is designated generally by the reference numeral 10. Control valve system 10 is shown as a schematic fluid circuit in FIG. 1 and as a fluid control valve in FIG. 2.

Referring now to FIG. 2, control valve system 10 comprises a housing 12 having a fluid inlet passage 14, a fluid outlet passage 16, a fluid exhaust passage 18, a first valve bore 20, a second valve bore 22, a first fluid reservoir 24 and a second fluid reservoir 26. Disposed within first valve bore 20 is a first valve member 28 and disposed within second valve bore 22 is a second valve member 30. Located within inlet passage 14 in a coaxial relationship with first valve member 28 is a third valve member 32. Also located within inlet passage 14 in a coaxial relationship with second valve member 30 is a fourth valve member 34. A pair of solenoid valves 36 and 38 is attached to housing 12.

A plurality of fluid passages interconnect valve bores 20 and 22 with inlet 14, outlet 16, exhaust 18, reservoir 24, reservoir 26, valve 36 and valve 38. A fluid passage 40 extends between inlet passage 14 and an intermediate chamber 42 formed by bore 20. A restrictor 44 is disposed within passage 40 to limit the amount of fluid flow through passage 40. A fluid passage 46 extends between inlet passage 14 and an intermediate chamber 48 formed by bore 22. A restrictor 50 is disposed within passage 46 to limit the amount of fluid flow through passage 46.

A fluid passage 52 extends between chamber 42 and a lower chamber 54 formed by bore 20. A restrictor 56 is disposed within passage 52 to limit the amount of fluid flow through passage 52. A fluid passage 58 extends between chamber 48 and a lower chamber 60 formed by bore 22. A restrictor 62 is disposed within passage 58 to limit the amount of fluid flow through passage 58. A fluid passage 64 extends between passage 52 and reservoir 24 such that restrictor 56 is located between chamber 42 and reservoir 24. A fluid passage 66 extends between reservoir 24 and the input to solenoid valve 38. A fluid passage 68 extends between passage 58 and reservoir 26 such that restrictor 62 is located between chamber 48 and reservoir 26. A fluid passage 70 extends between reservoir 26 and the input to solenoid valve 36. A passage 72 extends between the output of solenoid valve 36 and an upper chamber 74 formed by bore 20. A passage 76 extends between the output of solenoid valve 38 and an upper chamber 78 formed by bore 22.

A cross passage 80 extends between the lower portion of chamber 42 and the upper portion of chamber 48. A cross passage 82 extends between the lower portion of chamber 48 and the upper portion of chamber 42. A fluid passage 84 extends between passage 80 and outlet passage 16. A fluid passage 86 extends between passage 82 and outlet passage 16. Outlet passage 16 is in communication with exhaust passage 18 through two ports 88 and 90. The upper portions of chambers 54 and 60 are in communication with atmospheric pressure through passages 92 and 94, respectively. A reset passage 96 extends into housing 12 and is in communication with the lower portion of chambers 54 and 60 by communicating with passages 52 and 58, respectively. A pair of check valves 98 and 100 are disposed between reset passage 96 and passages 52 and 58 respectively, to prohibit fluid flow between passages 52 or 58 to reset passage 96 but allow fluid flow from reset passage 96 to one or both passages 52 and 58.

Disposed within bore 20 is valve body or member 102 and disposed within bore 22 is valve body or member 104. Valve member 102 comprises an upper piston 106, an intermediate piston 108 and a lower piston 110, all of which move together as a single unit. Upper piston 106 is disposed within chamber 74 and includes a valve seat 112 which opens and closes port 88 located between outlet passage 16 and exhaust passage 18. Intermediate piston 108 is disposed within chamber 42 and includes an annular passage 114 which fluidly connects passage 40 to passage 52 when piston 108 is seated against housing 12. Lower piston 110 is located within chamber 54 and includes a pair of seals 116 which seal inlet passage 14 from passage 92 and seal chamber 54 from passage 92. Valve member 104 comprises an upper piston 118, an intermediate piston 120 and a lower piston 122, all of which move together as a single unit. Upper piston 118 is disposed within chamber 78 and includes a valve seat 124 which opens and closes port 90 located between outlet passage 16 and exhaust passage 18. Intermediate piston 120 is disposed within chamber 48 and includes an annular passage 126 which fluidly connects passage 46 to passage 58 when piston 120 is seated against housing 12. Lower piston 122 is located within chamber 60 and includes a pair of seals 128 which seal inlet passage 14 from passage 94 and seal chamber 60 from passage 94.

Valve member 32 is located around lower piston 110 and comprises a valve seat 130 and a valve spring 132. Valve spring 132 biases valve seat 130 against housing 12 to prohibit fluid flow between inlet passage 14 and chamber 42. Valve member 34 is located around piston 122 and comprises a valve seat 134 and a valve spring 136. Valve spring 136 biases valve seat 134 against housing 12 to prohibit fluid flow between inlet passage 14 and chamber 48.

FIGS. 1 and 2 illustrate control valve system 10 in its deactuated position. Pressurized fluid from input passage 14 is biasing valve seats 130 and 134 against housing 12 closing communication between inlet passage 14 and both chambers 42 and 48. Pressurized fluid is provided to passage 40 through restrictor 44, to passage 52 through annular passage 114 through restrictor 56 and into chamber 54 to bias valve member 102 upward as shown in FIG. 2 seating piston 108 against housing 12. Pressurized fluid also flows through passage 52, through passage 64 to reservoir 24 and from reservoir 24 to the inlet of solenoid valve 38 through passage 66. In a similar manner, pressurized fluid from input passage 14 is provided to passage 46 through restrictor 50 to passage 58 through annular passage 126 through restrictor 62 and into chamber 60 to bias valve member 104 upward as shown in FIG. 2 seating piston 120 against housing 12. Pressurized fluid also flows through passage 58, through passage 68 to reservoir 26 and from reservoir 26 to the inlet of solenoid valve 36 through passage 70. Outlet passage 16 is in communication with exhaust passage 18 due to valve seats 112 and 124 being biased upward opening ports 88 and 90. Intermediate chambers 42 and 48 are also open to exhaust passage 18 through cross passages 80 and 82, respectively, through passages 84 and 86, respectively. The fluid pressure below piston 110 and 122 of valve members 102 and 104, respectively, bias valve members 102 and 104 upward maintaining control valve system 10 in the deactuated position. The connection between passages 40 and 52 through annular passage 114 and the connection between passages 46 and 58 through annular passage 126 maintain fluid pressure within chambers 54 and 60 and reservoirs 24 and 26.

Figure 3:
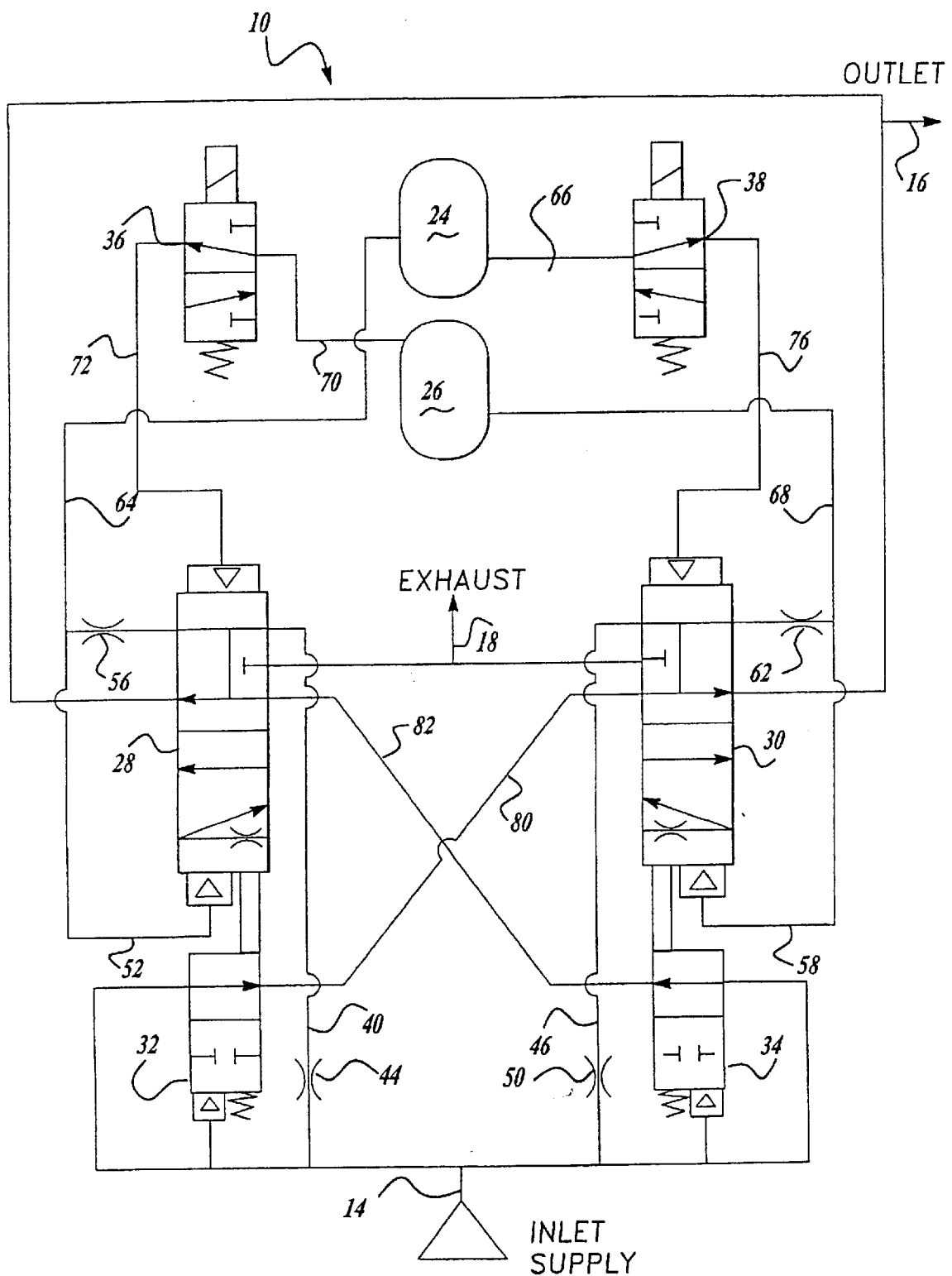
FIG. 3 is a schematic circuit diagram of the control valve system of the present invention shown in an actuated position.
Figure 4:
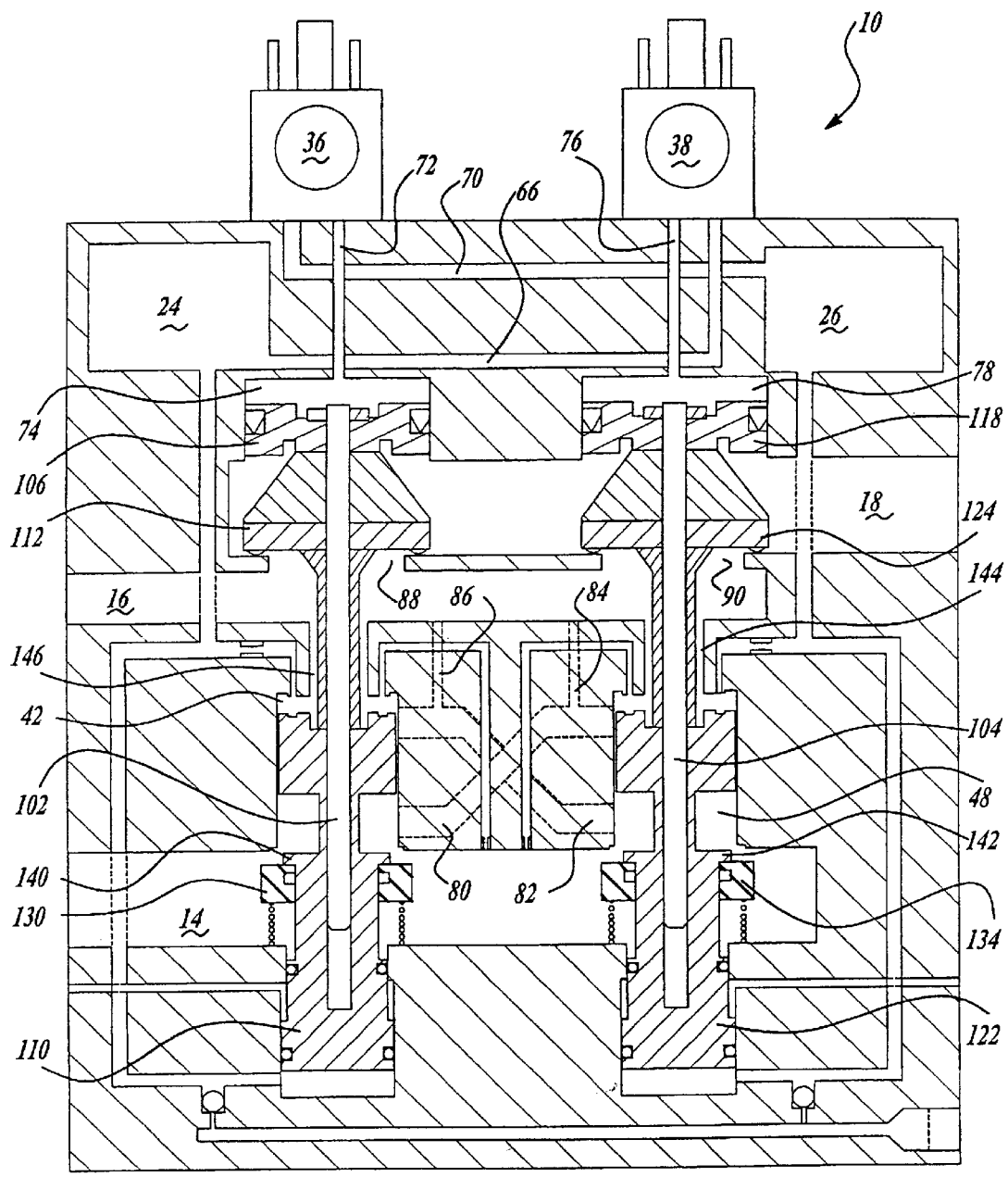
FIG. 4 is a schematic illustration of the control valve system shown in its actuated position.

FIGS. 3 and 4 illustrate control valve system 10 in its actuated position. Both solenoid valves 36 and 38 have been substantially simultaneously actuated. The actuation of solenoid valve 36 connects passage 70 and thus reservoir 26 to passage 72. Pressurized fluid is directed into chamber 74 to move valve member 102 downward as shown in FIG. 4. The diameter of piston 106 is larger than the diameter of piston 110, thus causing the load that moves valve member 102 downward. In a similar manner, the actuation of solenoid valve 38 connects passage 66 and thus reservoir 24 to passage 76. Pressurized fluid is directed into chamber 78 to move valve member 104 downward as shown in FIG. 4. The diameter of piston 118 is larger than the diameter of piston 122, thus causing the load that moves valve member 104 downward. When valve members 102 and 104 move downward, an annular flange 140 on piston 110 unseats valve seat 130 and an annular flange 142 on piston 122 unseats valve 134. Pressurized fluid flows from inlet passage 14 into the lower portion of chamber 42 through passage 80 to the upper portion of chamber 48 and through a gap 144 between valve member 104 and housing 12 to provide pressurized fluid to outlet passage 16. Pressurized fluid also flows through passage 84 to outlet passage 16. In a similar manner, pressurized fluid flows from inlet passage 14 into the lower portion of chamber 48 through passage 82 to the upper portion of chamber 42 and through a gap 146 between valve member 102 and housing 12 to provide pressurized fluid to outlet passage 16. Pressurized fluid also flows through passage 86 to outlet passage 16. The movement of valve members 102 and 104 downward seats valve seats 112 and 124 against housing 12 to close ports 88 and 90 to isolate outlet passage 16 from exhaust passage 18. The fluid pressure within reservoirs 24 and 26 will initially be reduced when valves 36 and 38 are actuated by the fluid pressure will return to supply pressure at inlet 14 because reservoirs 24 and 26 are still open to inlet 14 and outlet 16 is isolated from exhaust 18.

Figure 5:
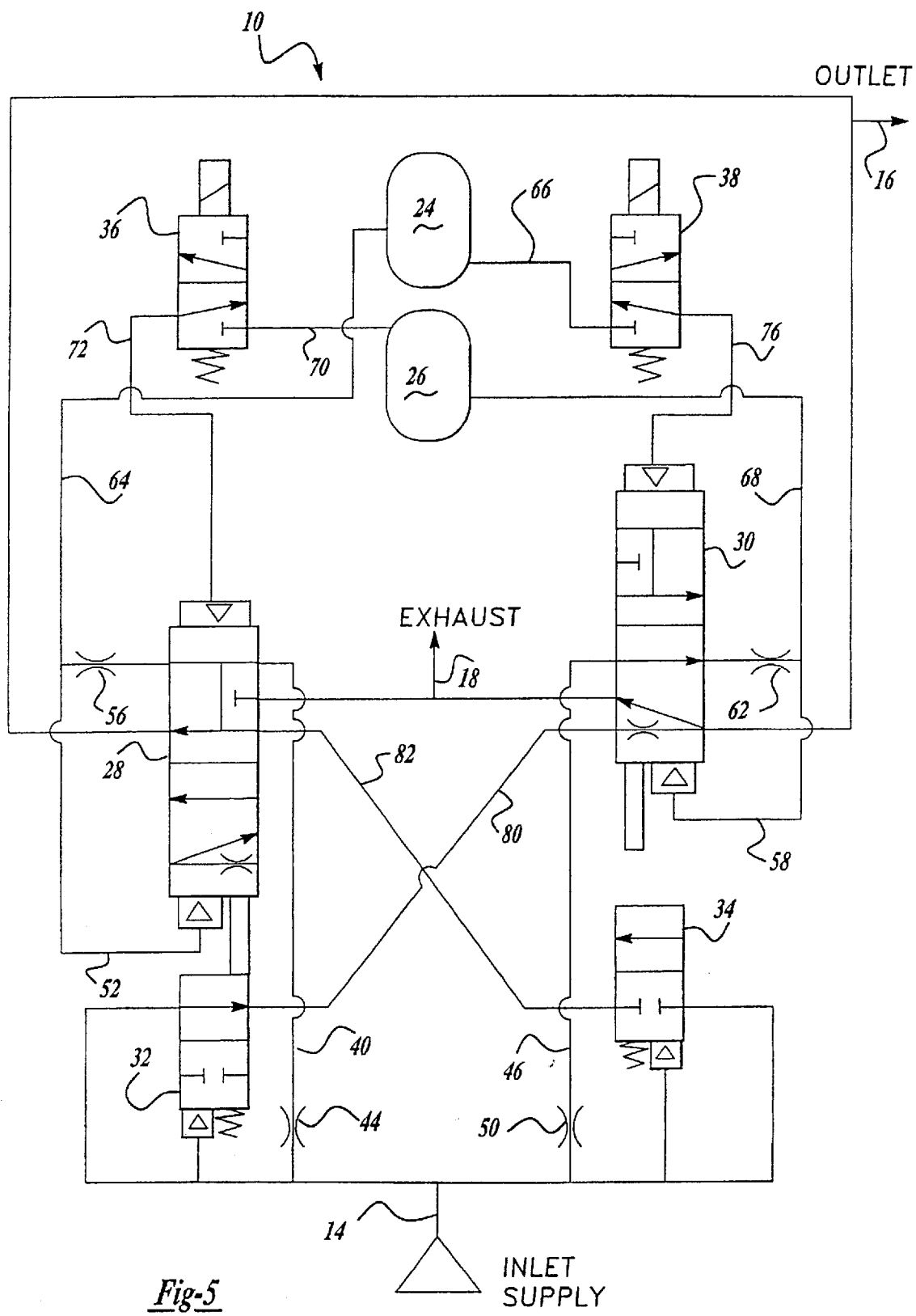
FIG. 5 is a schematic circuit diagram of the control valve system of the present invention shown in an abnormal position.
Figure 6:
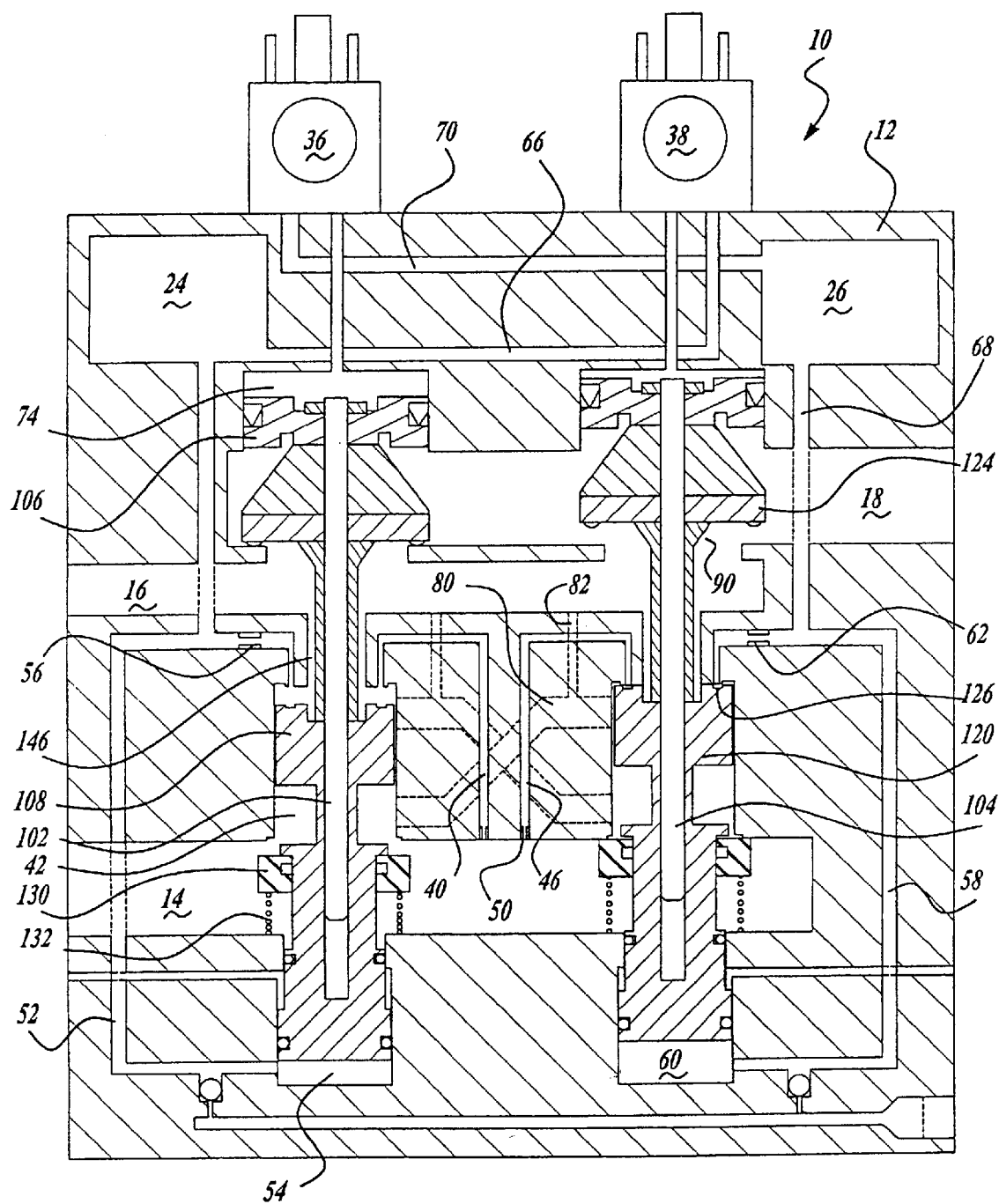
FIG. 6 is a schematic illustration of the control valve system shown in its abnormal position.

FIGS. 5 and 6 illustrate control valve system 10 in an abnormal position. In FIGS. 5 and 6, valve member 104 is located in its upward position while valve member 102 is located in its lower position. Both solenoid valves 36 and 38 are located in their deactuated position. Valve member 104 is located in its upward position similar to that shown in FIG. 1. Pressurized fluid from inlet passage 14 is supplied to passage 46 through restrictor 50 to passage 58 through annular passage 126 through restrictor 62 and into chamber 60 to bias valve member 104 upward as shown in FIG. 6 seating piston 120 against housing 12. Pressurized fluid also flows through passage 68 to reservoir 26 and from reservoir 26 to the inlet of solenoid valve 36 through passage 70. Outlet passage 16 is in communication with exhaust passage 18 due to valve seat 124 being biased upward thus opening port 90. Valve member 102 is located in its lower position which opens various passages to outlet passage 16 which, because the position of valve member 104, is open to exhaust 18. The upper portion of chamber 42 is open to exhaust through gap 146. Pressurized fluid from inlet passage 14 is bled to exhaust through passage 40 and through the upper portion of chamber 42 through gap 146, through outlet passage 16, through port 90 to exhaust passage 18. In addition, pressurized fluid from inlet passage 14 will bleed to exhaust 18 by entering the lower portion of chamber 42, flow through passage 80, through passage 84, through outlet passage 16, through port 90 and into exhaust passage 18.

Pressurized fluid in passage 52 and thus chamber 54 is also bled to exhaust through restrictor 56 which removes the biasing being applied to valve member 102. A leak path also exists from inlet 14 to the lower portion of chamber 42 to the upper portion of chamber 42 via a gap between piston 108 and the walls of bore 20. From the upper portion of chamber 42, fluid pressure may escape as described above. Yet another leak path exists from the lower portion of chamber 42 through passage 80, from upper portion to lower portion of chamber 48, and through passage 82 into upper portion of chamber 42. From the upper portion of chamber 42, fluid pressure may escape as described above. In addition, fluid pressure in reservoir 24 is bled to exhaust through restrictor 56 removing the pressurized fluid being supplied to solenoid valve 38 through passage 66. The amount of time for chamber 54 and reservoir 24 to bleed to exhaust will depend upon the size of chamber 54, reservoir 24 and restrictor 56. With the release of pressurized air from chamber 74 above piston 106 and the presence of pressurized air within inlet passage 14 acting against the bottom of valve seat 130, valve spring 132 will move valve member 102 to an intermediate position where valve seat 130 is seated against housing 12 but piston 108 is not seated against housing 12. This condition is shown in FIGS. 7 and 8.

Figure 7:
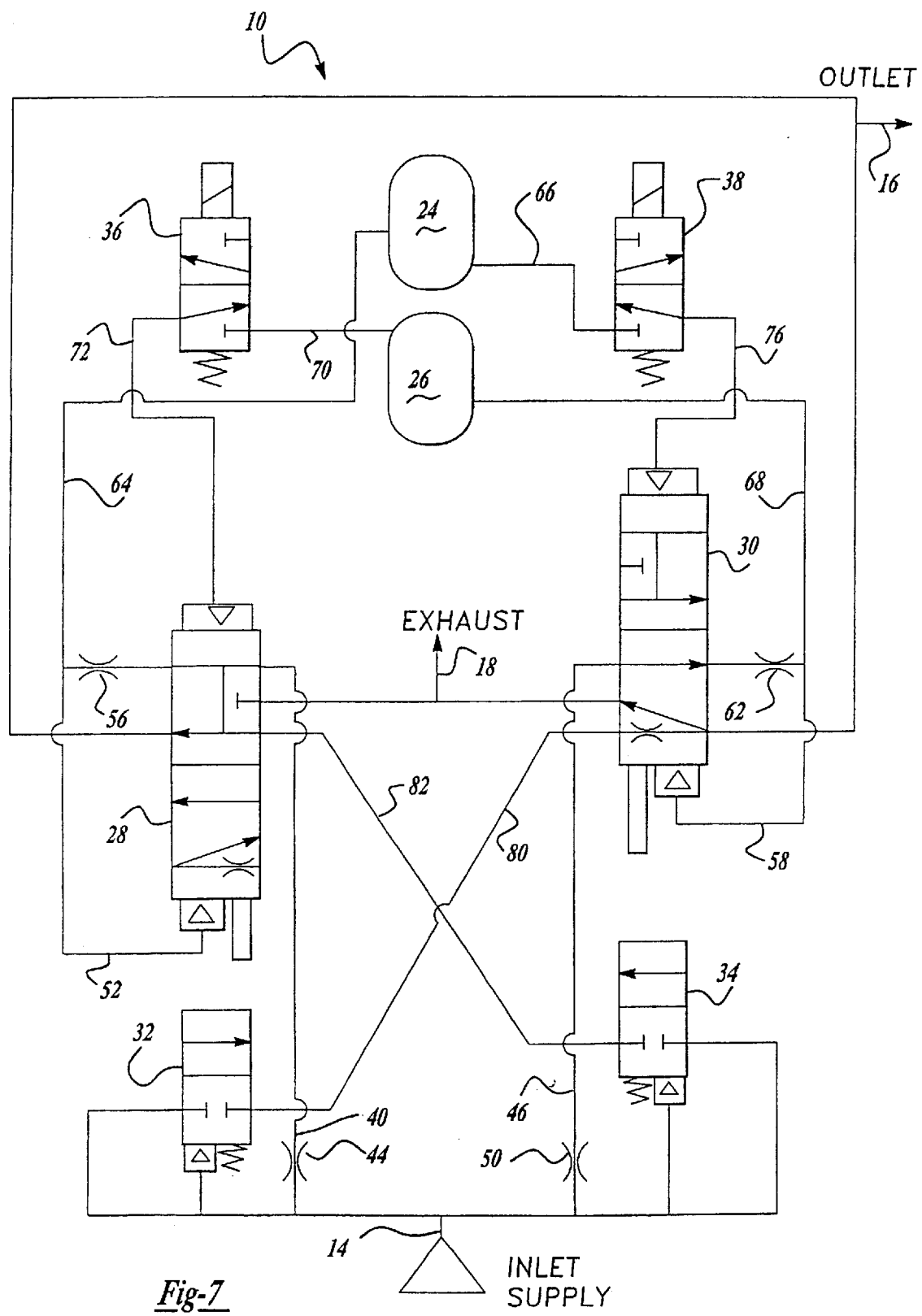
FIG. 7 is a schematic circuit diagram of the control valve system of the present invention shown in a locked out position.
Figure 8:
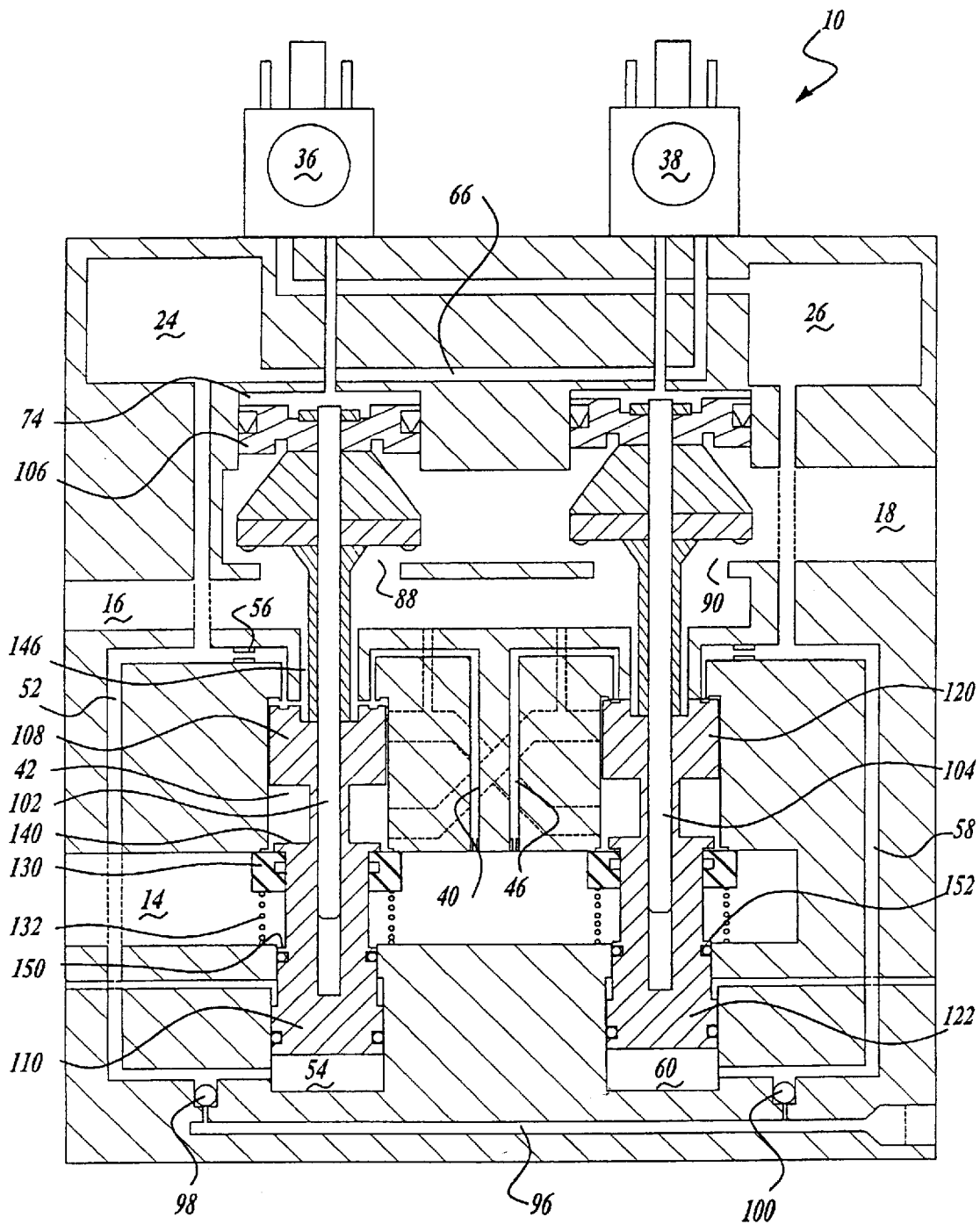
FIG. 8 is a schematic illustration of the control valve system shown in its locked out position.

FIGS. 7 and 8 illustrate control valve system 10 in a locked out position. When valve seat 130 urges valve member 102 upwards due to the biasing of valve spring 132, valve seat 130 pushes against annular flange 140 to move valve member 102. Because of a lost motion attachment between valve seat 130 and piston 110, when valve seat 130 engages housing 12, piston 108 has not yet engaged housing 12. Additional movement of valve member 102 is required to seat piston 108 against housing 12 and connect passage 40 to passage 52 and provide pressurized fluid to chamber 54 and reservoir 24. Without the seating of piston 108 to housing 12, the upper portion of chamber 42 and thus passages 40 and 52 are open to exhaust 18 through gap 146, outlet passage 16 and ports 88 and 90 and exhaust passage 18. Thus reservoir 24 is open to exhaust along with passage 66 and the input to solenoid valve 38. Chamber 54 is also open to exhaust, thus eliminating any biasing load that would urge valve member 102 upward to seat piston 108 against housing 12. An annular shoulder 150 located on piston 110 and open to inlet passage 14 biases valve member 102 downward with annular flange 140 being urged against valve seat 130 to keep valve member 102 in its intermediate position and control valve system 10 in its locked out position. A similar shoulder 152 is located on piston 122.

When it is desired to move control valve system 10 from its locked out position to its deactuated position shown in FIG. 1, pressurized fluid is supplied to reset passage 96. Pressurized fluid being supplied to reset passage 96 opens check valve 98 and pressurized fluid fills reservoir 24 and chamber 54. Restrictor 56 will limit the amount of fluid bled off to exhaust during the resetting procedure. Once reservoir 24 and chamber 54 are filled with pressurized fluid, the fluid within chamber 54 acts against piston 110 to move valve member 102 upward to seat piston 108 against housing 12. Fluid passage 40 is again in communication with passage 52 and control valve system 10 is again positioned in its deactuated position as shown in FIGS. 1 and 2.

While the above description of FIGS. 5 through 8 have been described with valve member 102 being located in its intermediate and locked out position and valve member 104 being located in its deactuated position, it is to be understood that a similar locked out position of control valve system 10 would occur if valve member 102 were located in its deactuated condition and valve member 104 were located in its intermediate and locked out condition. The resetting procedure of applying pressurized fluid to reset passage 96 would cause the pressurized fluid to open check valve 100 to fill reservoir 26 and chamber 60. The pressurized fluid in chamber 60 would lift valve member 104 to seat piston 120 against housing 12 reconnecting passage 46 with passage 58.

Thus, control valve system 10 is a fully fluid operating valve system which has the capability of sensing an abnormal condition and responding to this abnormal condition by switching to a locked out condition which then requires an individual to go through a resetting operation before control valve system 10 will again function.

Figure 9:
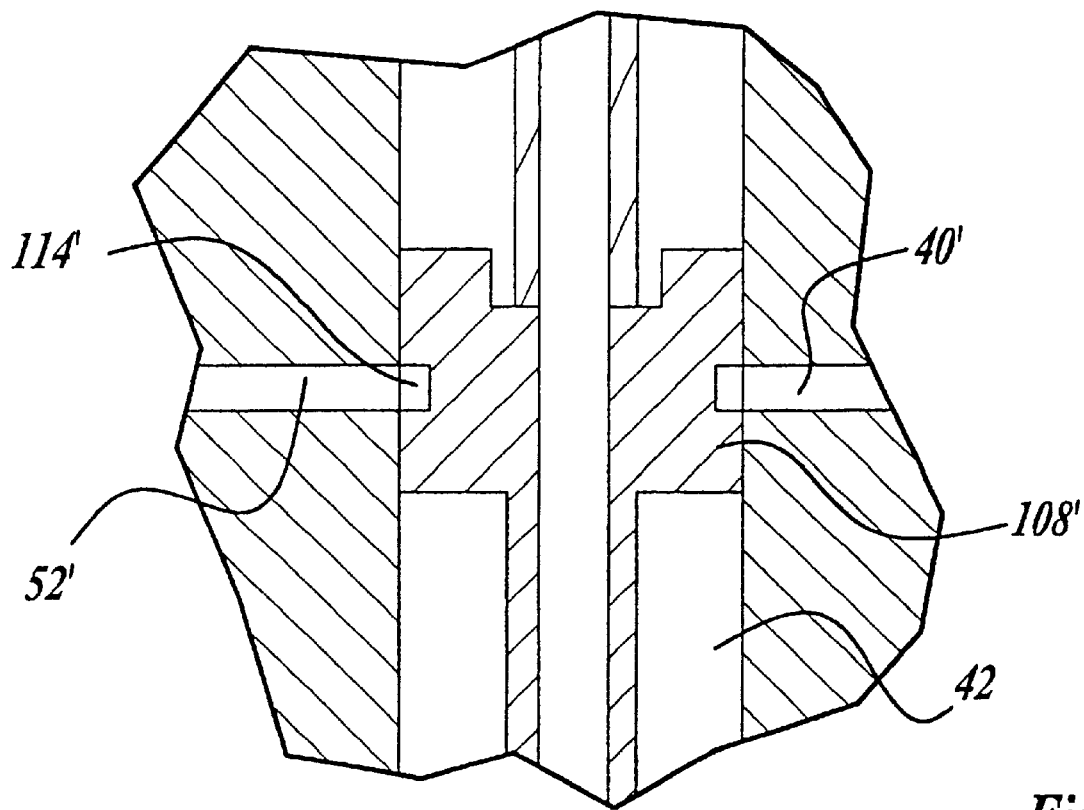
FIG. 9 is a schematic illustration of the valving system in accordance with another embodiment of the present invention.

FIG. 9 illustrates another embodiment of the present invention. In the embodiment shown in FIGS. 1–8, piston 108 includes annular passage 114 located in an upper surface of piston 108 to fluidly connect passage 40 with passage 52. FIG. 9 illustrates a piston 108' which fluidly connects a passage 40' with a passage 52' through a passage 114' located on the external surface of piston 108'. In a similar manner, piston 120 of valve member 104 could be replaced with piston 108'. Fluid passage 40' is the same as fluid passage 40 and fluid passage 52 is the same as fluid passage 52 with the exception that passages 40' and 52' enter chamber 42 through a vertical wall whereas passages 40 and 52 enter chamber 42 through a horizontal wall. The operation of the embodiment shown in FIG. 9 is identical to that described above for FIGS. 1 through 8.

FIGS. 10 through 19 illustrate a control valve system having anti-tiedown capability in accordance with the present invention which is designated generally by the reference numeral 510. It should be noted that in FIGS. 10 through 19, like reference numerals designate like or corresponding parts throughout the several views. It should also be noted that like or corresponding parts from FIGS. 1 through 8 will have added 500 to the reference numerals of FIGS. 1 through 9. Control valve system 510 is shown as a schematic fluid circuit in FIG. 10 and as a fluid control valve in FIG. 11.

Figure 11:
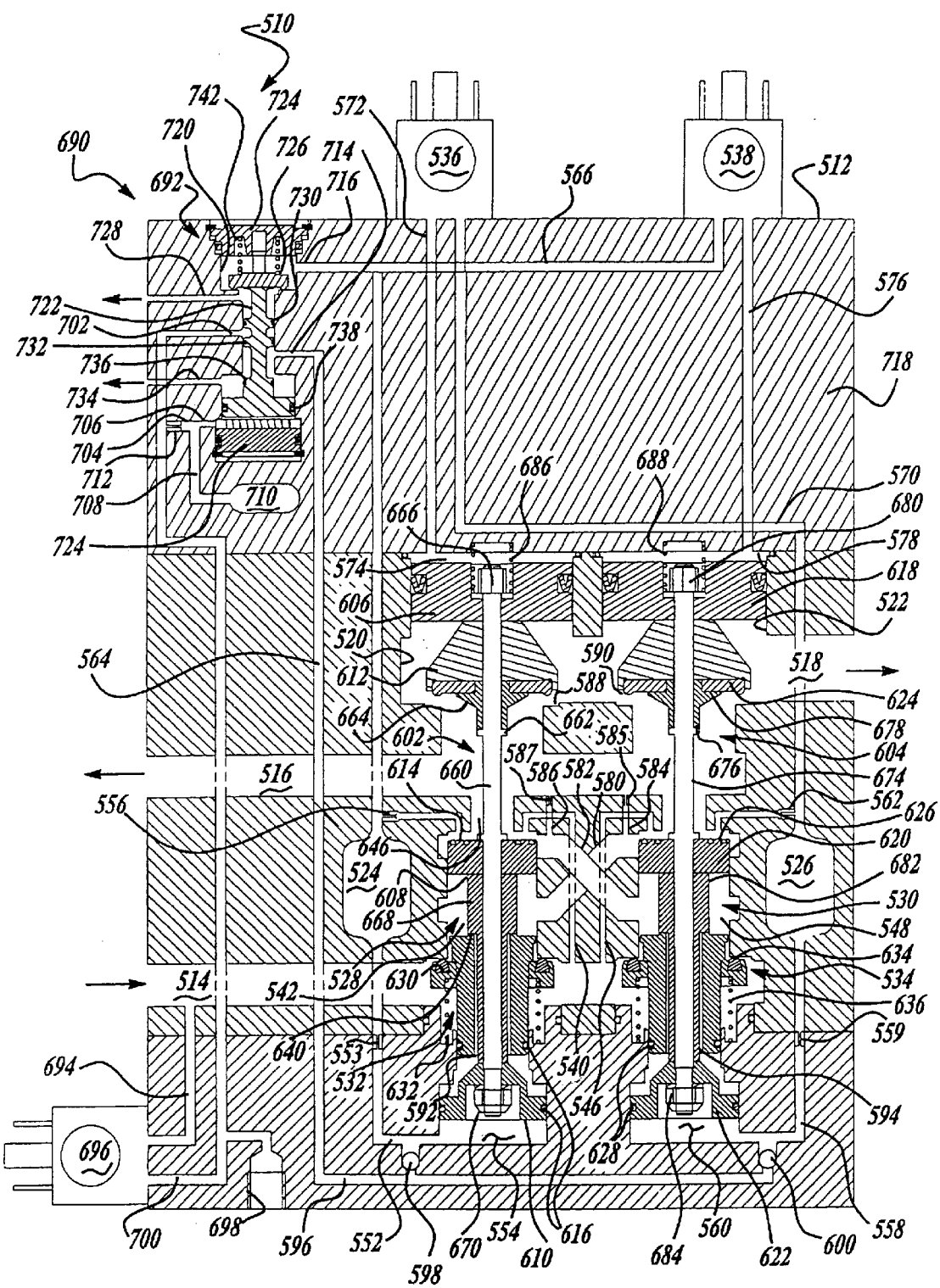
FIG. 11 is a cross-sectional view of the control valve system shown in the pre-start condition.

Referring now to FIG. 11, control valve system 510 comprises a housing 512 having a fluid inlet passage 514, a fluid outlet passage 516, a fluid exhaust passage 518, a first valve bore 520, a second valve bore 522, a first fluid reservoir 524, and a second fluid reservoir 526. Disposed within first valve bore 520 is a first valve member 528, and disposed within second valve bore 522 is a second valve member 530. Located within inlet passage 514 in a coaxial relationship with first valve member 528 is a third valve member 532. Also located within inlet passage 514 in a coaxial relationship with second valve member 530 is a fourth valve member 534. A pair of solenoid valves 536 and 538 is attached to housing 512.

A plurality of fluid passages interconnect valve bores 520 and 522 with inlet 514, outlet 516, exhaust 518, reservoir 524, reservoir 526, solenoid valve 536 and solenoid valve 538. A fluid passage 540 extends between inlet passage 514 and an intermediate chamber 542 formed by bore 520. A fluid passage 546 extends between inlet passage 514 and an intermediate chamber 548 formed by bore 522.

A fluid passage 552 extends between chamber 542 and a lower chamber 554 formed by bore 520. A restrictor 556 is disposed within passage 552 to limit the amount of fluid flow through passage 552. A fluid passage 558 extends between chamber 548 and a lower chamber 560 formed by bore 522. A restrictor 562 is disposed within passage 558 to limit the amount of fluid flow through passage 558. Reservoir 524 forms part of passage 552 such that restrictor 556 is located between chamber 542 and reservoir 524.

A restrictor 553 is disposed within passage 552 between reservoir 524 and lower chamber 554 to limit the amount of fluid flow between lower chamber 554 and reservoir 524. A fluid passage 566 extends between reservoir 524 and the input to solenoid valve 538. Reservoir 526 forms part of passage 558 such that restrictor 562 is located between chamber 548 and reservoir 526. A restrictor 559 is disposed within passage 558 between reservoir 526 and lower chamber 560 to limit the amount of fluid flow between lower chamber 560 and reservoir 526.

A fluid passage 570 extends between reservoir 526 and the input to solenoid valve 536. A passage 572 extends between the output of solenoid valve 536 and an upper chamber 574 formed by bore 520. A fluid passage 576 extends between the output of solenoid valve 538 and an upper chamber 578 formed by bore 522.

A cross passage 580 extends between the lower portion of chamber 542 and the upper portion of chamber 548. A cross passage 582 extends between the lower portion of chamber 548 and the upper portion of chamber 542. A fluid passage 584 extends between passage 580 and outlet passage 516. A restrictor 585 is disposed within passage 584 to limit the amount of fluid flow through passage 584. A fluid passage 586 extends between passage 582 and outlet passage 516. A restrictor 587 is disposed within passage 586 to limit the amount of fluid flow through passage 586. Outlet passage 516 is in communication with exhaust passage 518 through two ports 588 and 590. The upper portions of chambers 554 and 560 are in communication with exhaust port 18 through passages 592 and 594, respectively.

A reset passage 596 extends through housing 512 and is in communication with the lower portion of chambers 554 and 560 by communicating with passages 552 and 558, respectively. A pair of check valves 598 and 600 are disposed between reset passage 596 and passages 552 and 558 respectively, to prohibit fluid flow between passages 552 or 558 to reset passage 596 but allow fluid flow from reset passage 596 to one or both passages 552 and 558.

Disposed within bore 520 is valve member 602 and disposed within bore 522 is valve member 604. Valve member 602 comprises an upper piston 606, an intermediate piston 608 and a lower piston 610, all of which move together as a single unit. Upper piston 606 is disposed within chamber 574 and includes a valve seat 612 which opens and closes port 588 located between outlet passage 516 and exhaust passage 518. Intermediate piston 608 is disposed within chamber 542 and includes an annular passage 614 which fluidly connects passage 540 to passage 552 when piston 608 is seated against housing 512. Lower piston 610 is located within chamber 554. A pair of seals 616 seal inlet passage 514 from passage 592 and seal chamber 554 from passage 592.

As described above, valve member 602 comprises an upper piston 606, an intermediate pistons 608, and a lower piston 610, all of which move together as a single unit. The respective pistons 606, 608, and 610 each include central bores through which passes a valve stem 660. Valve stem 660 includes a pair of lands 662 which provide end stops for one or more of the respective pistons. For example, upper piston 606, valve seat 612, and spacer 664 are seated on an upper land 662. A nut 666 threadably engages a threaded portion of valve stem 660 to maintain upper piston 606, valve seat 612, and spacer 664 against upper land 662. Similarly, a lower land 662 provides an end stop for intermediate piston 608, a spacer 668, and lower piston 610, which are retained against the lower land 662 via a nut 670 which threadably engages a lower end of valve stem 660. Spacer 668 is formed so that valve member 602 moves independently from valve member 532.

Valve member 604 comprises an upper piston 618, an intermediate piston 620 and a lower piston 622 all of which move together as a single unit. Upper piston 618 is disposed within chamber 578 and includes a valve seat 624 which opens and closes port 590 located between outlet passage 516 and exhaust passage 518. Intermediate piston 620 is disposed within chamber 548 and includes an annular passage 626 which fluidly connects passage 546 to passage 558 when piston 620 is seated against housing 512. Lower piston 622 is located within chamber 560. A pair of seals 628 seal inlet passage 514 from passage 594 and seal chamber 560 from passage 594.

As described above, valve member 604 comprises an upper piston 618, an intermediate piston 620, and a lower piston 622, all of which move together as a single unit. The respective pistons 618, 620, and 622 each include central bores through which passes a valve stem 674. Valve stem 674 includes a pair of lands 676 which provide end stops for one or more of the respective pistons. For example, upper piston 618, valve seat 624, and spacer 678 are seated on an upper land 676. A nut 680 threadably engages a threaded portion of valve stem 674 to maintain upper piston 618, valve seat 624, and spacer 678 against upper land 676. Similarly, a lower land 676 provides an end stop for intermediate piston 620, a spacer 682, and lower piston 622 are retained against the lower land 676 via a nut 684 which threadably engages a lower end of valve stem 674. Spacer 682 is formed so that valve member 604 moves independently from valve member 534.

Valve member 532 is located around spacer 668 and comprises a valve seat 630 and a valve spring 632. Valve spring 632 biases valve seat 630 against housing 512 to prohibit fluid flow between inlet passage 614 and chamber 642. Valve member 534 is located around spacer 682 and comprises a valve seat 634 and a valve spring 636. Valve spring 636 biases valve seat 634 against housing 512 to prohibit fluid flow between inlet passage 514 and chamber 548.

A particular feature of this invention includes an anti-tiedown circuit 690 which inhibits actuation of first valve member 530 during a reset operation. The anti-tiedown circuit 690 includes an anti-tiedown valve 692. A fluid passage 694 extends between inlet passage 514 to the input to solenoid 696. A fluid passage 700 extends from the output of solenoid 696 to an input port 702 of anti-tiedown valve 692. A reset port 698 fluidly connects to fluid passage 700 and provides an alternative, typically operator supplied, means for pressurizing fluid passage 700. An actuation passage 704 extends between fluid passage 700 and actuation port 706. A reservoir passage 708 extends between actuation passage 704 and fluid reservoir 710. A restrictor 712 is disposed within actuation passage 704 to limit the amount of fluid flow through passage 704. An outlet port 714 connects to reset passage 596. A vent port 716 connects to passage 566.

Anti-tiedown valve 692 comprises a valve body 718 which also forms part of housing 512. Valve body 718 includes a central bore 720. A valve spool 722 translates within central bore 720 between end structures 724. At its upper end, valve spool 722 includes a valve seat 726 that opens and closes a passage between vent port 716 and upper exhaust port 728. Valve spool 722 also includes an o-ring 730 that provides a seal between upper exhaust passage 728 and input port 702. Similarly, o-ring 732 provides a seal between input port 702, outlet port 714, and lower exhaust port 734. A third o-ring 736 provides a seal between outlet port 714 and lower exhaust port 734 when anti-tiedown valve 692 is an actuated position. A fourth o-ring 738 provides a seal between actuation port 706 and second exhaust port 734.

Figure 12:
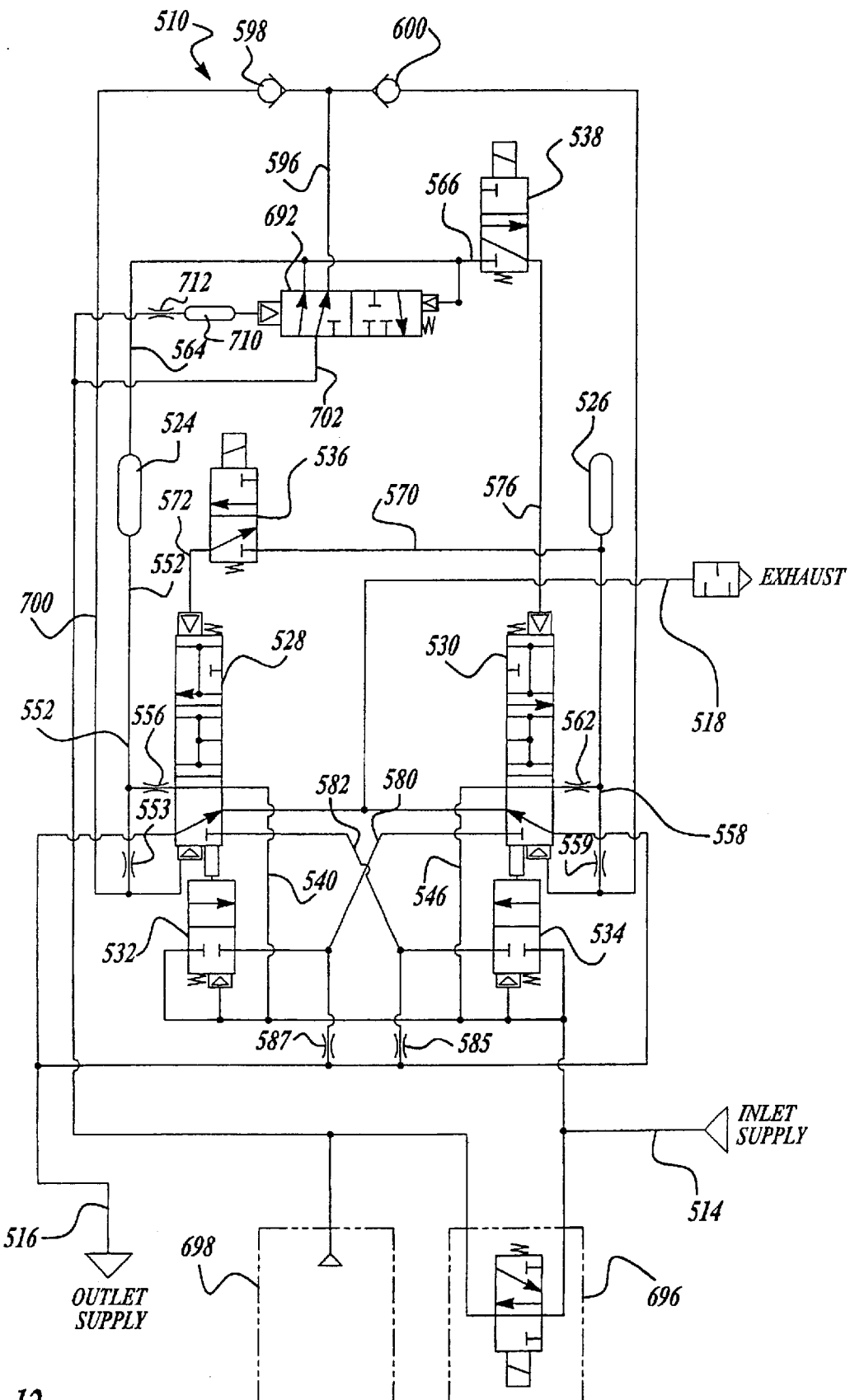
FIG. 12 is a schematic circuit diagram of the control valve system having an anti-tiedown circuit of the present invention shown in a reset position.

FIGS. 11 and 12 illustrate control valve system 510 in an initial position. It should be noted that FIGS. 11 and 12 also illustrate control valve system 510 in a locked out position. A lockout condition occurs when at least one of the intermediate pistons 608 or 620 assumes the position shown in FIG. 11. Displacement of the valves from a locked out to a deactuated position will be described with respect to first valve member 528. However, displacement of second valve member 530 occurs in a similar manner. When valve seat 630 urges valve member 602 upwards due to the biasing of valve spring 632, valve seat 630 pushes against annular flange 640 to move valve member 602. Because first valve member 528 and third valve member 532 may move independently, when valve seat 632 engages housing 512, piston 608 has not yet engaged housing 512. Additional movement of valve member 602 is required to seat piston 608 against housing 512 and connect passage 540 to passage 552 and provide pressurized fluid to chamber 554 and reservoir 524. Without the seating of piston 608 to housing 512, the upper portion of chamber 542 and thus passages 540 and 552 are open to exhaust 518 through gap 646, outlet passage 516, ports 588 and 590, and exhaust passage 18. Thus reservoir 524 is open to exhaust along with passage 566 and the input to solenoid valve 538. Chamber 554 is also open to exhaust, thus eliminating any biasing load that would urge valve member body 602 upward to seat piston 608 against housing 512. A spring 686 urges intermediate piston 608 downward via valve stem 660, with annular flange 640 being urged against valve seat 630 to keep valve member body 602 in its intermediate position and control valve system 510 in its startup (body valves) or locked out (one valve) position. A similar configuration applies to the other main valve.

Figure 14:
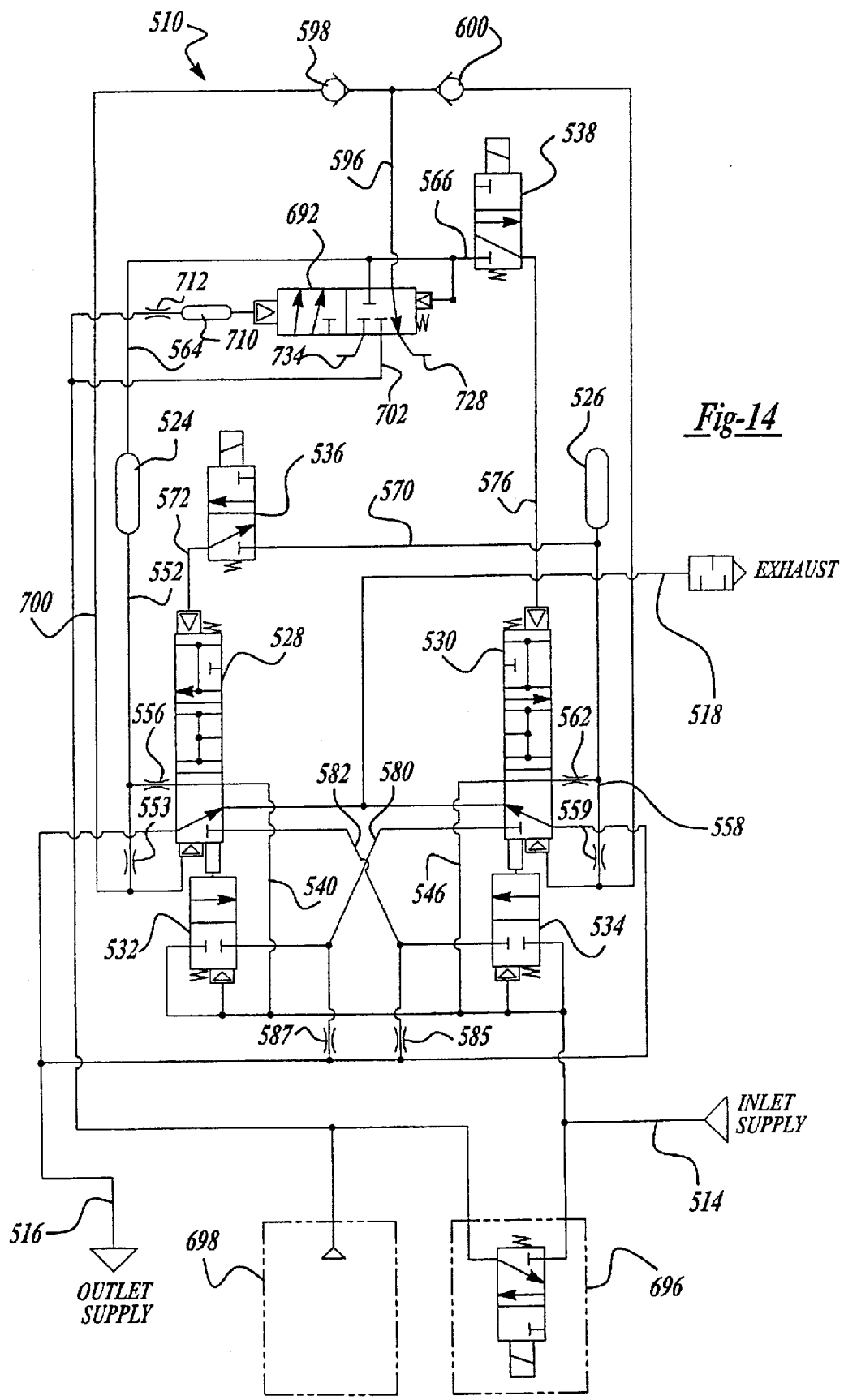
FIG. 14 is a schematic circuit diagram of the control valve system having an anti-tiedown circuit of the present invention shown in a deactuated position.
Figure 15:
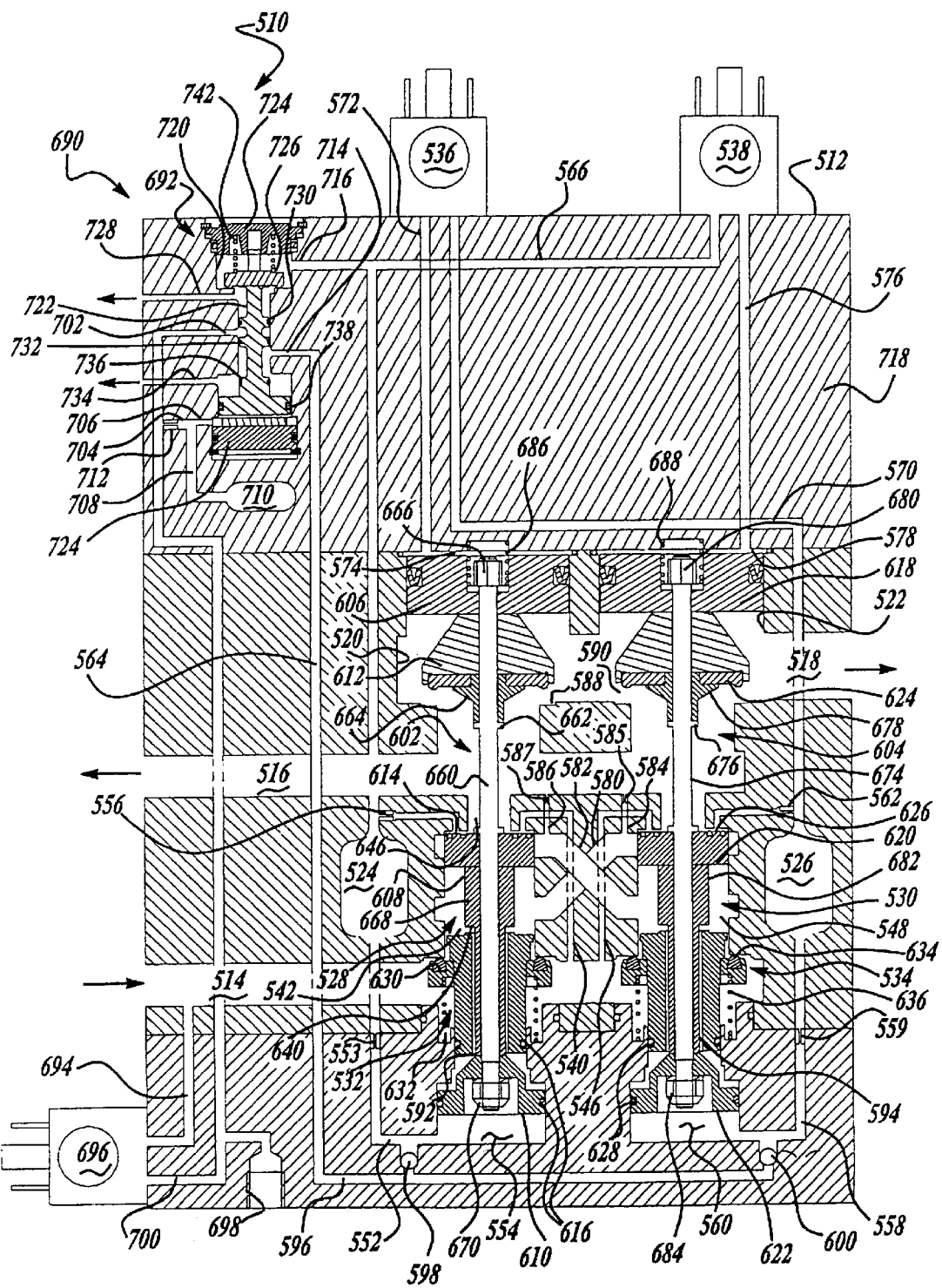
FIG. 15 is a cross-sectional view of the control valve system shown in its deactuated position.

When it is desired to move control valve system 510 from its initial, or locked out, position to its deactuated position shown in FIGS. 14 and 15, pressurized fluid must be supplied to reset passage 596. Pressurized fluid being supplied to reset passage 596 opens check valves 598, 600, and pressurized fluid fills reservoirs 554 and 560. Restrictors 556 and 562 will limit the amount of fluid bled off to exhaust during the resetting procedure. Similarly, restrictors 553 and 559 will limit the amount of fluid entering respective reservoirs 524 and 526. Once reservoirs 524 and 526 and chambers 554 and 560 are filled with pressurized fluid, the fluid within chambers 554 and 560 acts against pistons 610 and 622 to move valve members 602 and 604 upward to seat pistons 608 and 620 against housing 512. Fluid passages 540 and 546 are again in communication with passages 552 and 558 and control valve system 510 is again positioned in its deactuated position as shown in FIGS. 14 and 15.

Figure 13:
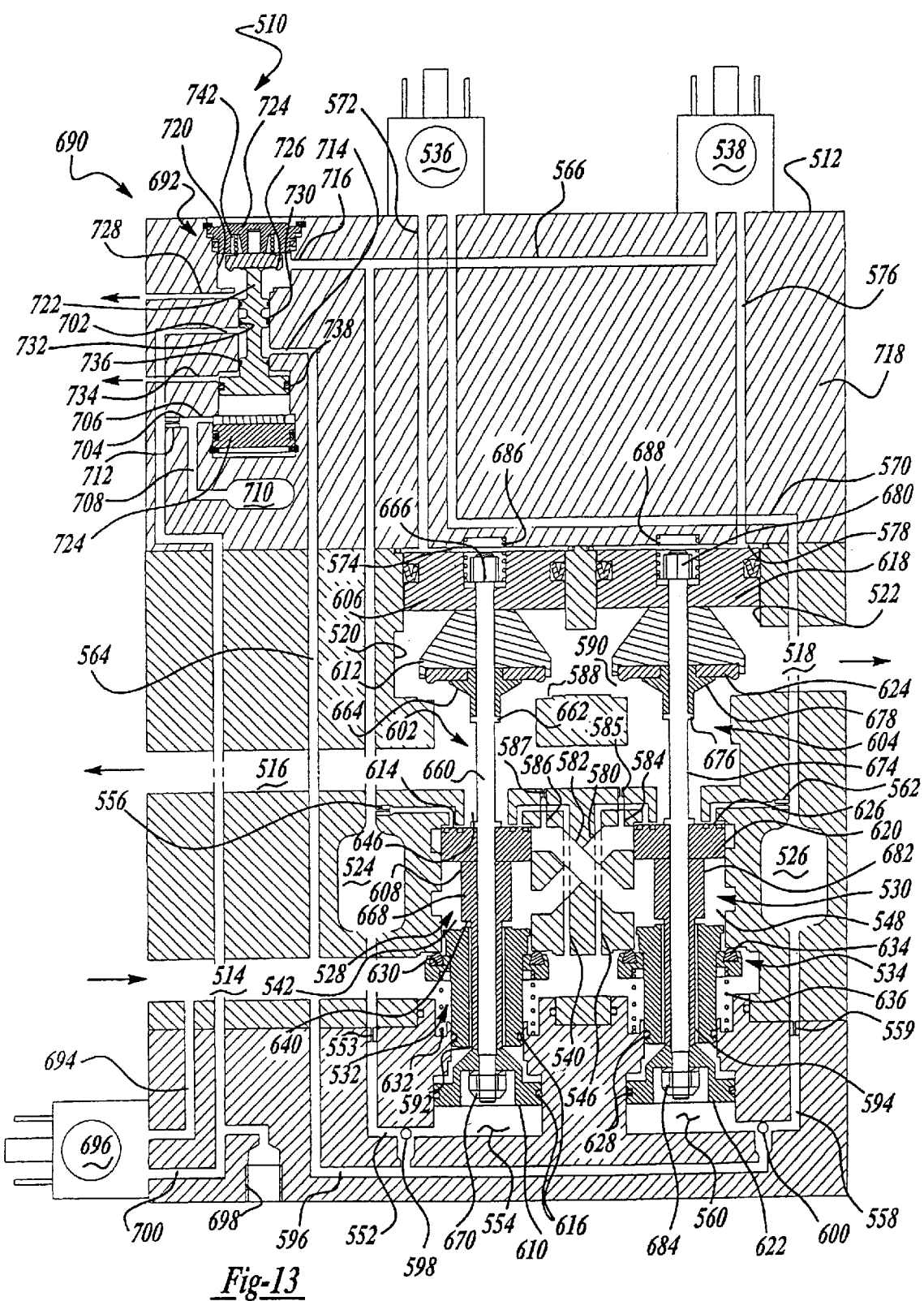
FIG. 13 is a cross-sectional view of the control valve system shown in its reset position.

As best illustrated in FIGS. 12 and 13, in a particular feature of the present invention is that pressurization of reset passage 596 is controlled through a novel anti-tiedown circuit 690, including an anti-tiedown valve 692. Anti-tiedown circuit 690 prevents pressurization of reset passage without previous depressurization of reservoir 524 and passage 566, thereby preventing solenoid 538 from providing fluid pressure to passage 576 and chamber 578. This prevents displacement of first valve member 530 to an actuated position. Thus, anti-tiedown valve 692 prevents pressurizing outlet passage 16 during a reset operation.

To effect a reset operation when one or both of first valve member 528 or second valve member 530 is in a locked-out position, such as may occur during initial start up or a locked out condition, fluid passage 700 must be pressurized. Pressurization of fluid passage 700 can occur through reset activation of solenoid 696 which receives input fluid pressure from inlet passage 514 via fluid passage 694. Upon actuation of reset solenoid 696, inlet fluid pressure is applied to fluid passage 700. Alternatively, valve housing 512 includes an optional reset port 698 which may be provided for use with a customer supplied reset fluid pressure.

Upon application of one of the alternative reset signals, fluid pressure and in passage 700 causes upward displacement of valve spool 722 resulting from pressurization of chamber 740. The input fluid pressure applied through fluid passage 700 also pressurizes reservoir 710. Upward displacement of valve spool 722 enables communication between fluid passage 566 and upper exhaust port 728. This vents fluid pressure and reservoir 526 and fluid passage 566 to exhaust, thereby preventing actuation of first valve member 528. Upward displacement of valve spool 722 also enables communication between pressurized fluid passage 700 and reset passage 596, causing displacement of first valve member 528 and/or second valve member 530 to a deactuated position, as described above with respect to FIGS. 10 and 11. During this operation, fluid restrictors 553 and 559 limit fluid flow into respective reservoirs 524 and 526. This ensures that a higher pressure will build in chambers 554 and 560, thereby displacing pistons 608 and 620 upward to effect the reset operation. Further, so long as fluid passage 700 is pressurized, either by reset solenoid 696 or customer supplied reset signal 698, fluid passage 566 will be vented through upper exhaust passage 728, thereby insuring deactuation of first valve member 530.

Upon removal of the reset signal, either through reset solenoid 596 or customer supplied reset support 698, biasing member 742 displaces valve spool 722 downward disabling communication between fluid passage 700 and reset passage 596. Downward displacement of valve spool 722 resultantly closes off communication between fluid passage 700 and reset passage 596, thereby relieving pressure to check valves 598, 600. Downward displacement of valve spool 722 also causes reset passage 596 to vent through lower exhaust port 734, thereby providing a continuous exhaust for reset passage 596 so that reset passage 596 is only pressurized during the reset operation and otherwise vented to exhaust. Also, valve seat 726 closes off communication between passage 566 and upper exhaust port 728, thereby enabling pressurization of reservoir 526. Reservoirs 524 and 526 are thus sufficiently pressurized to maintain a sufficient pressure in respective chambers 554 and 560 to maintain first valve member 528 and second valve member 530 in a deactuated position.

FIGS. 14 and 15 illustrate control valve system 510 in its deactuated position. Pressurized fluid from input passage 514 is biasing valve seats 630 and 634 against housing 512 closing communication between inlet passage 514 and both chambers 542 and 548. Pressurized fluid is provided to passage 540, to passage 552 through annular passage 614 through restrictor 556 to reservoir 524 through restrictor 553 and into chamber 554 to bias valve member 602 upward as shown in FIG. 15 seating piston 608 against housing 512. Pressurized fluid also flows from reservoir 24 to the inlet of solenoid valve 538 through passage 566. In a similar manner, pressurized fluid from input passage 514 is provided to passage 546 to passage 558 through annular passage 626 through restrictor 562 to reservoir 526 through restrictor 559 and into chamber 560 to bias valve member 604 upward as shown in FIG. 15 seating piston 620 against housing 512. Pressurized fluid also flows from reservoir 526 to the inlet of solenoid valve 536 through passage 570. Outlet passage 516 is in communication with exhaust passage 518 due to valve seats 612 and 624 being biased upward opening ports 588 and 590. Intermediate chambers 542 and 548 are also open to exhaust passage 518 through cross passages 580 and 582, respectively, through passages 584 and 586, respectively. The fluid pressure below piston 610 and 622 of valve members 602 and 604, respectively, bias valve members 602 and 604 upward maintaining control valve system 510 in the deactuated position. The connection between passages 540 and 552 through annular passage 614 and the connection between passages 546 and 558 through annular passage 626 maintain fluid pressure within chambers 554 and 560 and reservoirs 524 and 526.

Figure 16:
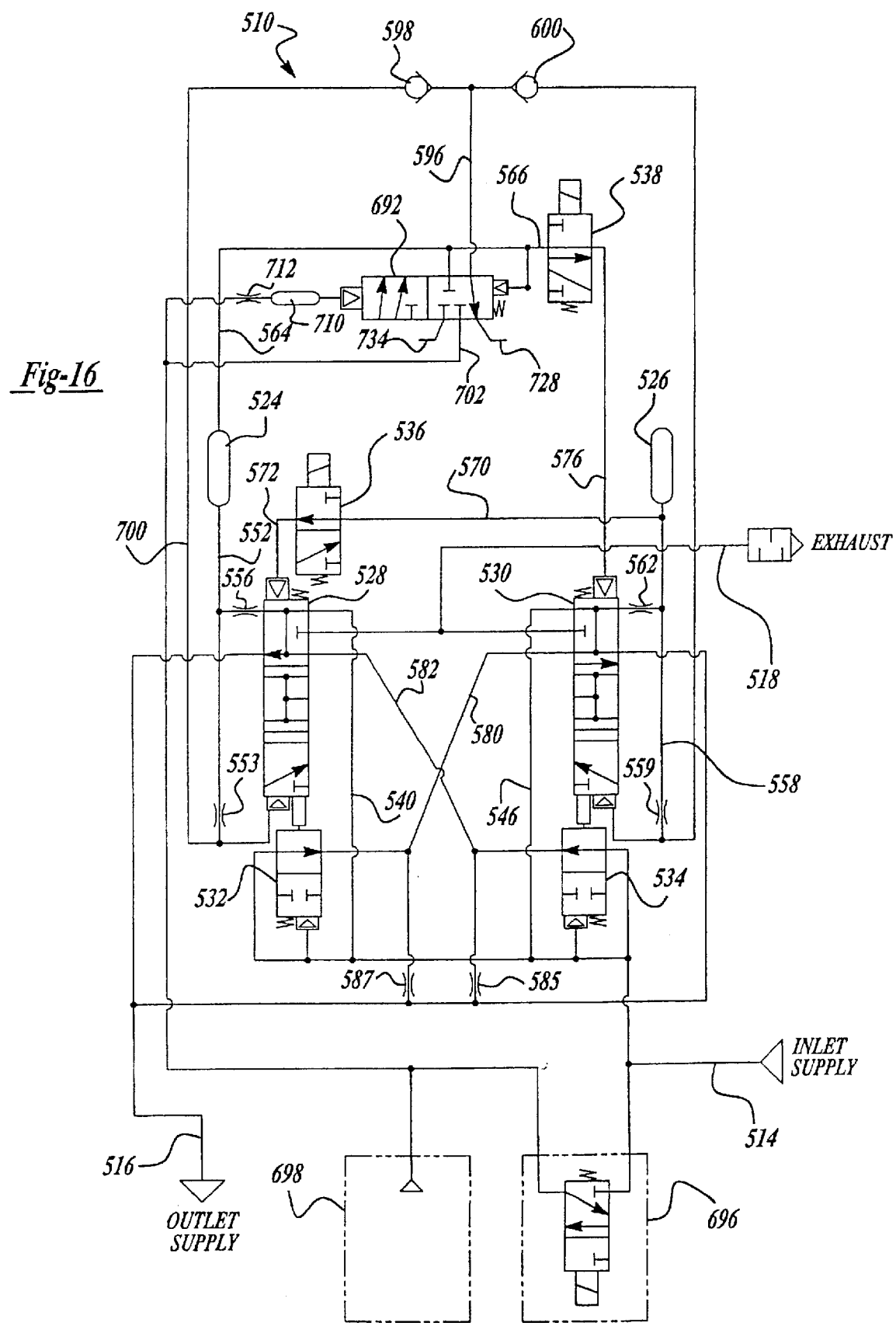
FIG. 16 is a schematic circuit diagram of the control valve system having an anti-tiedown circuit of the present invention shown in an actuated position.
Figure 17:
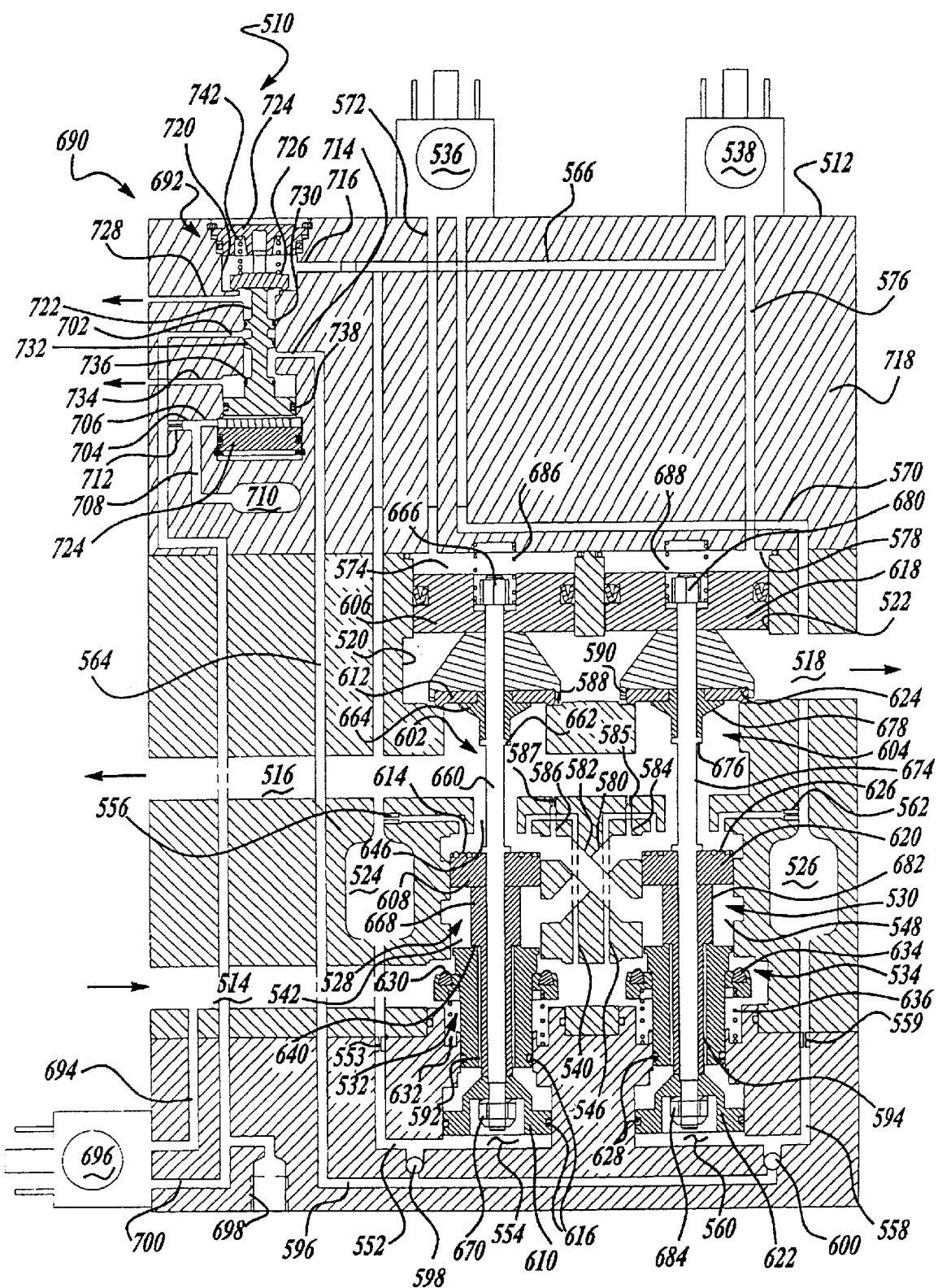
FIG. 17 is a cross-sectional view of the control valve system shown in its actuated position.

FIGS. 16 and 17 illustrate control valve system 510 in its actuated position. Both solenoid valves 536 and 538 have been substantially simultaneously actuated. The actuation of solenoid valve 536 connects passage 570 and thus reservoir 526 to passage 572. Pressurized fluid is directed into chamber 574 to move valve member 602 downward as shown in FIG. 17. The diameter of piston 606 is larger than the diameter of piston 610 thus causing the load which moves valve member 602 downward. In a similar manner, the actuation of solenoid valve 538 connects passage 566 and thus reservoir 524 to passage 576. Pressurized fluid is directed into chamber 578 to move valve member 604 downward as shown in FIG. 17. The diameter of piston 618 is larger than the diameter of piston 622 thus causing the load which moves valve member 604 downward. When valve members 602 and 604 move downward, an annular flange 640 on piston 610 unseats valve seat 630 and an annular flange 642 on piston 622 unseats valve 634. Pressurized fluid flows from inlet passage 514 into the lower portion of chamber 542 through passage 580 to the upper portion of chamber 548 and through a gap 644 between valve member 604 and housing 512 to provide pressurized fluid to outlet passage 516. Pressurized fluid also flows through passage 584 to outlet passage 516. In a similar manner, pressurized fluid flows from inlet passage 514 into the lower portion of chamber 548 through passage 582 to the upper portion of chamber 542 and through a gap 646 between valve member 602 and housing 512 to provide pressurized fluid to outlet passage 516. Pressurized fluid also flows through passage 586 to outlet passage 516. The movement of valve members 602 and 604 downward seats valve seats 612 and 624 against housing 512 to close ports 588 and 590 to isolate outlet passage 516 from exhaust passage 518. The fluid pressure within reservoirs 524 and 526 will initially be reduced when valves 536 and 538 are actuated, but the fluid pressure will return to supply pressure at inlet 514 because reservoirs 524 and 526 are still open to inlet 514 and outlet 516 is isolated from exhaust 518.

Figure 10:
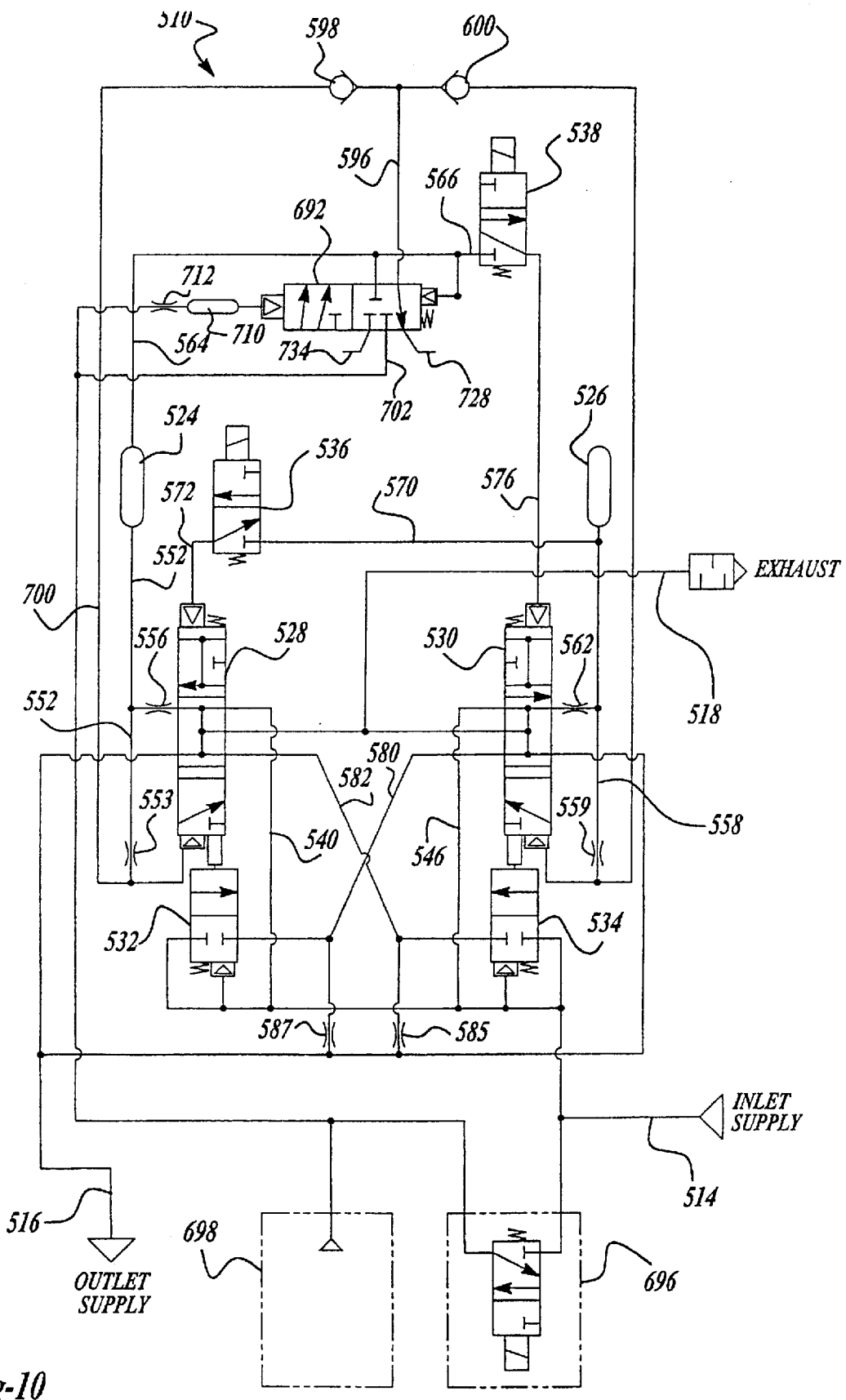
FIG. 10 is a schematic circuit diagram of the control valve system having an anti-tiedown circuit according to a second embodiment of the present invention shown in a pre-start condition.
Figure 18:
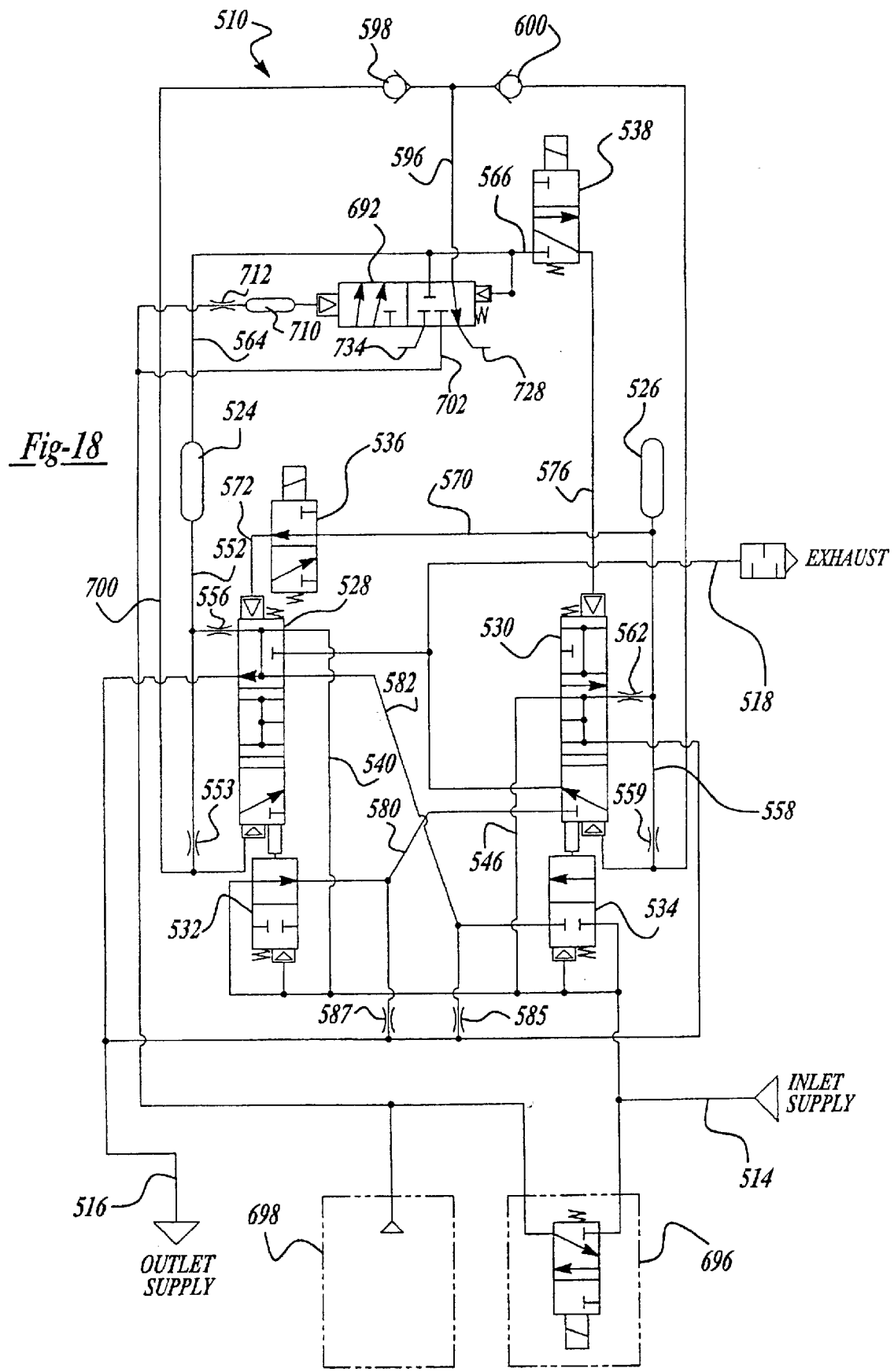
FIG. 18 is a schematic circuit diagram of the control valve system having an anti-tiedown circuit of the present invention shown in an abnormal position.
Figure 19:
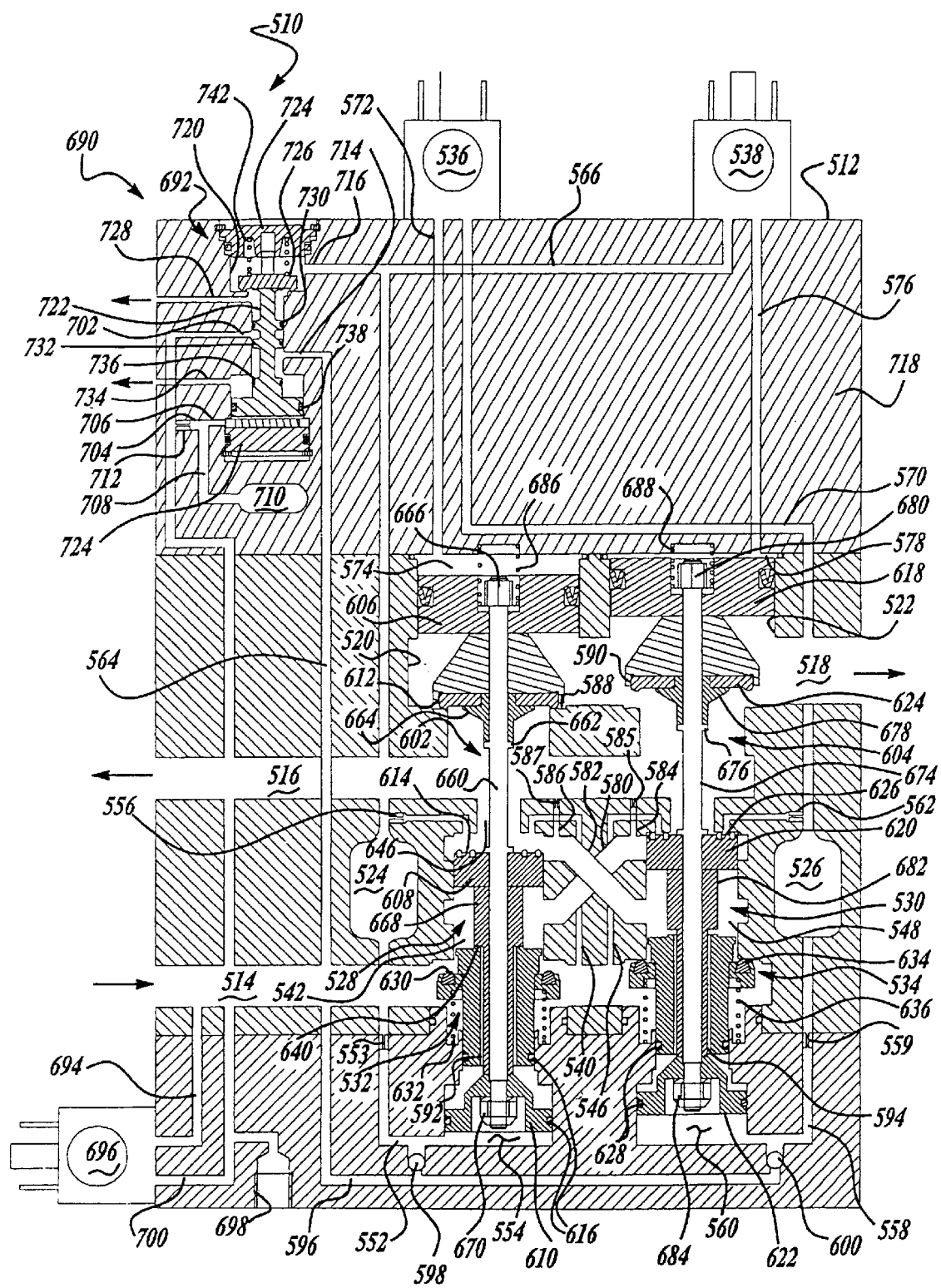
FIG. 19 is a cross-sectional view of the control valve system shown in its abnormal position.

FIGS. 18 and 19 illustrate control valve system 510 in an abnormal position. In FIGS. 18 and 19, valve member 604 is located in its upward position while valve member 602 is located in its lower position. Both solenoid valves 536 and 538 are located in their deactuated position. Valve member 604 is located in its upward position similar to that shown in FIG. 15. Pressurized fluid from inlet passage 514 is supplied to passage 546 to passage 558 through annular passage 626 through restrictor 562 and into chamber 560 to bias valve member 604 upward as shown in FIG. 19 seating piston 620 against housing 12. Pressurized fluid also flows to reservoir 526 and from reservoir 526 to the inlet of solenoid valve 536 through passage 570. Outlet passage 516 is in communication with exhaust passage 518 due to valve seat 624 being biased upward, thus opening port 590. Valve member 602 is located in its lower position which opens various passages to outlet passage 516 which, because the position of valve member 604, is open to exhaust 518. The upper portion of chamber 542 is open to exhaust through gap 646. Pressurized fluid from inlet passage 514 is bled to exhaust through passage 540 and through the upper portion of chamber 542 through gap 646, through outlet passage 516, through port 590 to exhaust passage 518. In addition, pressurized fluid from inlet passage 514 will bleed to exhaust 518 by entering the lower portion of chamber 542, flow through passage 580, through passage 584, through outlet passage 516, through port 590 and into exhaust passage 518. Pressurized fluid in passage 552 and thus chamber 554 is also bled to exhaust through restrictors 553 and 556 which removes the biasing being applied to valve member 602. A leak path also exists from inlet 514 to the lower portion of chamber 542 to the upper portion of chamber 542 via a gap between piston 608 and the walls of bore 520. From the upper portion of chamber 542, fluid pressure may escape as described above. Yet another leak path exists from the lower portion of chamber 542 through passage 580, from upper portion to lower portion of chamber 548, and through passage 582 into upper portion of chamber 542. From the upper portion of chamber 542, fluid pressure may escape as described above. In addition, fluid pressure in reservoir 524 is bled to exhaust through restrictor 556 removing the pressurized fluid being supplied to solenoid valve 538 through passage 566. The amount of time for chamber 554 and reservoir 524 to bleed to exhaust will depend upon the size of chamber 54, reservoir 524 and restrictors 553 and 556. With the release of pressurized air from chamber 574 above piston 606 and the presence of pressurized air within inlet passage 514 acting against the bottom of valve seat 630, valve spring 532 will move valve member 602 to an intermediate position where valve seat 630 is seated against housing 512 but piston 608 is not seated against housing 512. This condition is shown in FIGS. 10 and 11.

While the above description of FIGS. 18 and 19 have been described with valve member 602 being located in its intermediate, and locked out position and valve body 604 being located in its deactuated position, it is to be understood that a similar locked out position of control valve system 510 would occur if valve member 602 were located in its deactuated condition and valve member 604 were located in its intermediate and locked out condition.

Thus, control valve system 510 is a fully fluidly operating valve system which has the capability of sensing an abnormal condition and responding to this abnormal condition by switching to a locked out condition which then requires an individual to go through a resetting operation before control valve system 510 will again function. Control valve system 510 further prevents operation of the valve during a reset operation.

Figure 20:
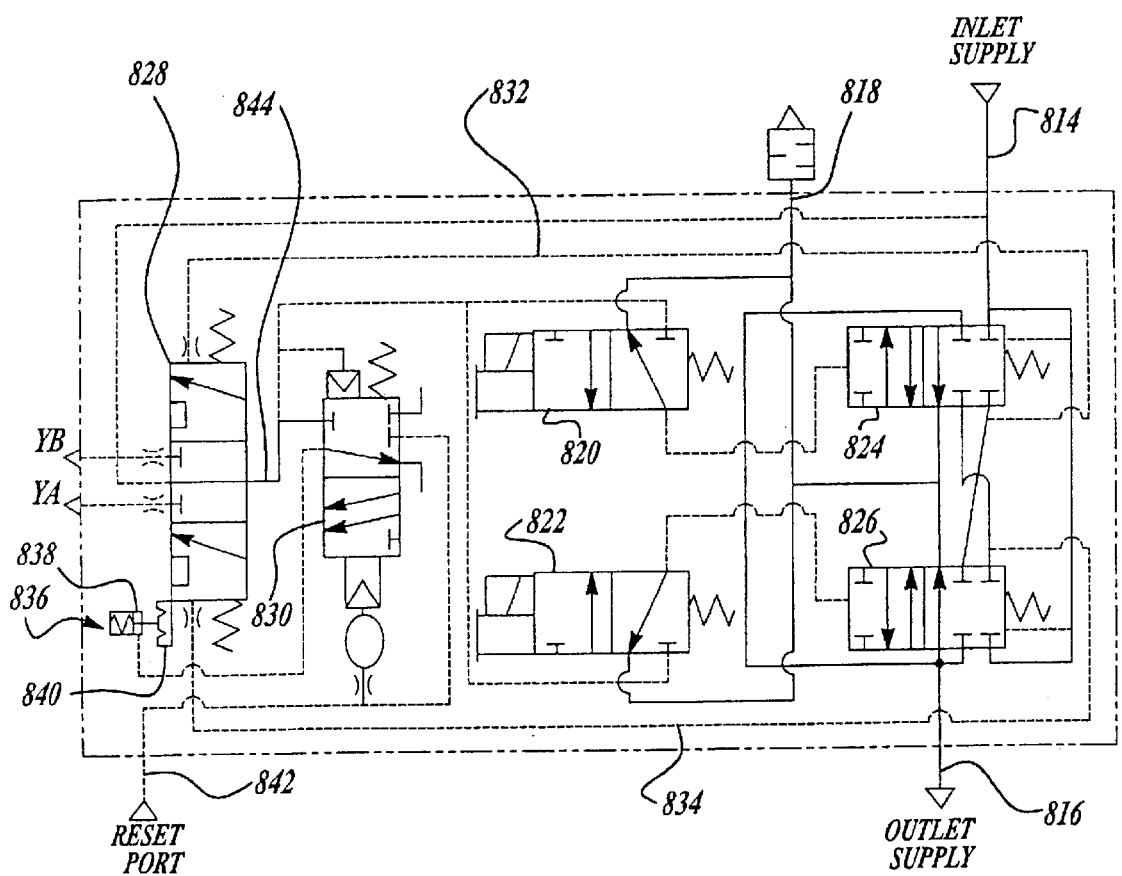
FIG. 20 is a schematic circuit diagram of the control valve system having an anti-tiedown circuit according to a third embodiment of the present invention shown in its deactuated position.

The control valve systems 10 and 510 described above in FIGS. 1–19 are generally referred to as crossmirror valves because they are configured to include a monitoring feature integral to the design of the valve. These valves offer particular features to the customer. An alternative valve configuration may generally be referred to as a crossflow valve. A typical crossflow valve comprises a body and valve elements, but does not inherently include a monitoring circuit for detecting when the valve systems are in an abnormal configuration. Such a valve may be referred to as a double valve, and FIG. 20 illustrates a schematic circuit diagram for control valve system 810, which defines yet another embodiment of the present invention. With reference to FIG. 20, control valve system 810 includes an inlet supply 814, an outlet supply 816, and an exhaust 818. Solenoid valve 820 controls actuation of first valve member 824. Similarly, solenoid valve 822 controls actuation of second valve member 826. Solenoid valves 820 and 822 must be actuated within a predetermined time period, and respective first valve member 824 and second valve member 826 must actuate and deactuate within a predetermined time period in order to prevent transition of control valve system 810 to a locked out position. Control valve system 810 also includes a lockout spool 828 and anti-tiedown valve 830. It should be noted that solenoid valves 820 and 822 are analogous to respective solenoid valves 36, 38 and 536, 538, as described above. Similarly, it should be noted that main valve members 824, 826 are analogous to first valve members 28, 30 and 528, 530 described above. Similarly, anti-tiedown valve 830 is analogous to anti-tiedown valve 592 described above.

Lock out spool 828 is a four port, three position spool valve which monitors fluid pressure on fluid passages 832 and 834, which reflect the pressure output by main valve members 824, 826. When the pressures are generally equal, spool valve 828 assumes a centered position. When the pressure becomes unequal, lock out spool 828 shifts, thereby exhausting input pressure to port YA and exhausting control pressure applied to anti-tiedown valve 830 and solenoid valves 822, 824 to port YB. A lock out switch 836 includes a lockout pin 838. Lock out pin 838 is biased in the direction of a notched member 840 which moves in accordance with a displaceable portion of lockout spool 828. Notched member 840 includes a pair of notches, one of which lockout pin 838 engages as lockout member 840 shifts in accordance with the spool portion of lockout spool 828. Once in a locked out position, fluid pressure must be applied to reset port 842 in order to return lockout spool 828 to its center position by pressurizing lock out pin 838 away from notched member 840 thereby enabling lock out spool 828 to return to its center position, so long as the pressure inputs on fluid passages 832 and 834 are generally equal.

Anti-tiedown valve 830 operates similarly as described above in order to provide a path from fluid passage 844 to exhaust through anti-tiedown valve 830 during reset. In operation, applying fluid pressure to reset port 842 displaces anti-tiedown valve 830 to an actuated position. In the actuated position, anti-tiedown valve 830 provides a path to exhaust for fluid passage 844. Also when in an actuated position, anti-tiedown valve 830 provides a path from reset port 842 to reset pin 838. The reset pressure pressurizes a chamber that overcomes the biasing force of a spring that biases reset pin 838 towards notched member 840. During the reset operation, fluid pressure cannot be applied to either of solenoid valves 820, 822, and thus cannot be applied to respective main valve members 824, 826. This prevents application of inlet pressure on outlet supply 816. Once fluid pressure is removed from reset port 842, anti-tiedown valve 830 returns to its deactuated position, as described above with respect to FIGS. 10–19, enabling operation of main valve members 824, 826.

FIGS. 21 through 32 illustrate a control valve system having anti-tiedown capability in accordance with the present invention which is designated generally by the reference numeral 1010.

Figure 21:
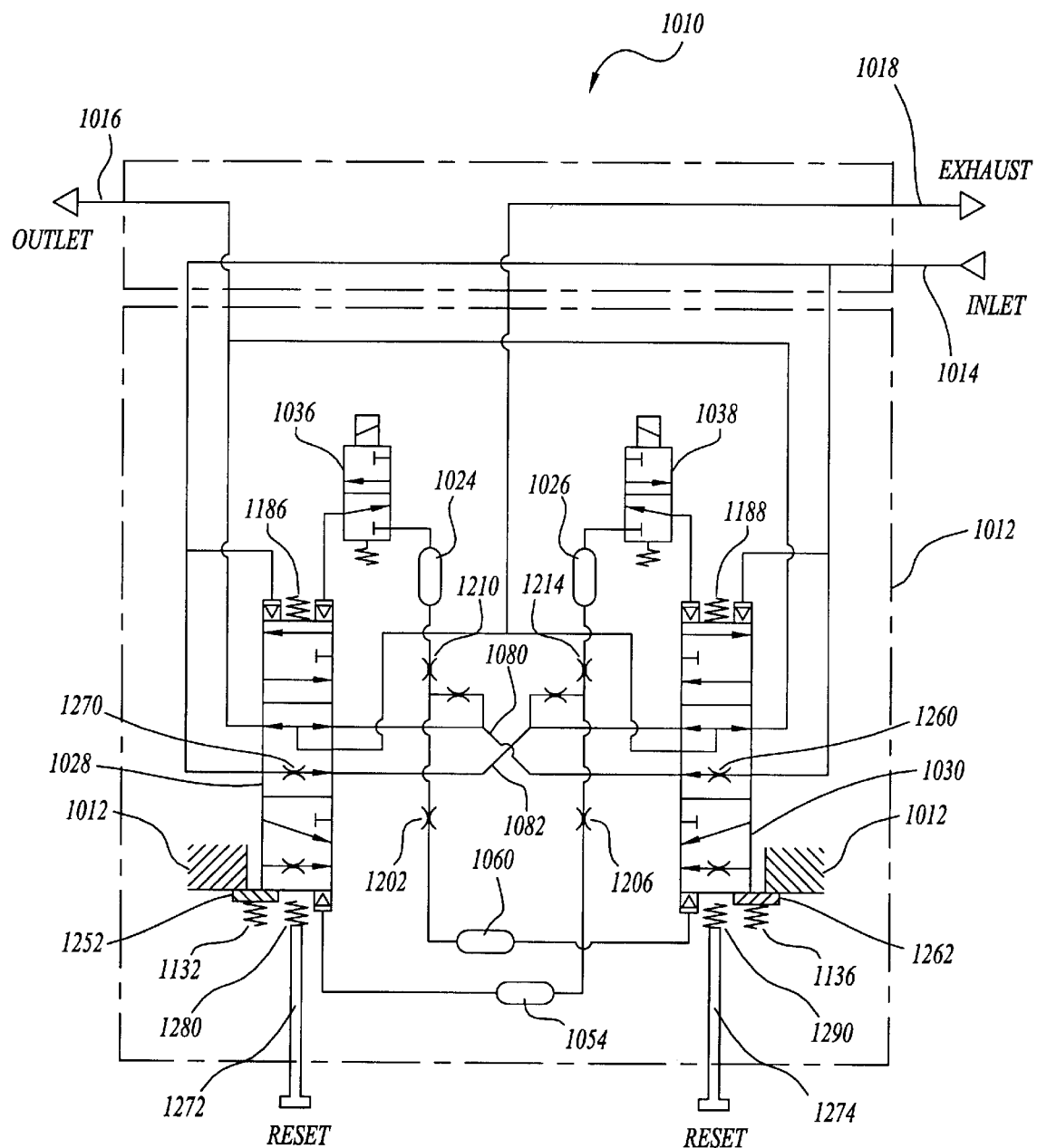
FIG. 21 is a schematic circuit diagram of the control valve system according to a fourth embodiment of the present invention.
Figure 22:
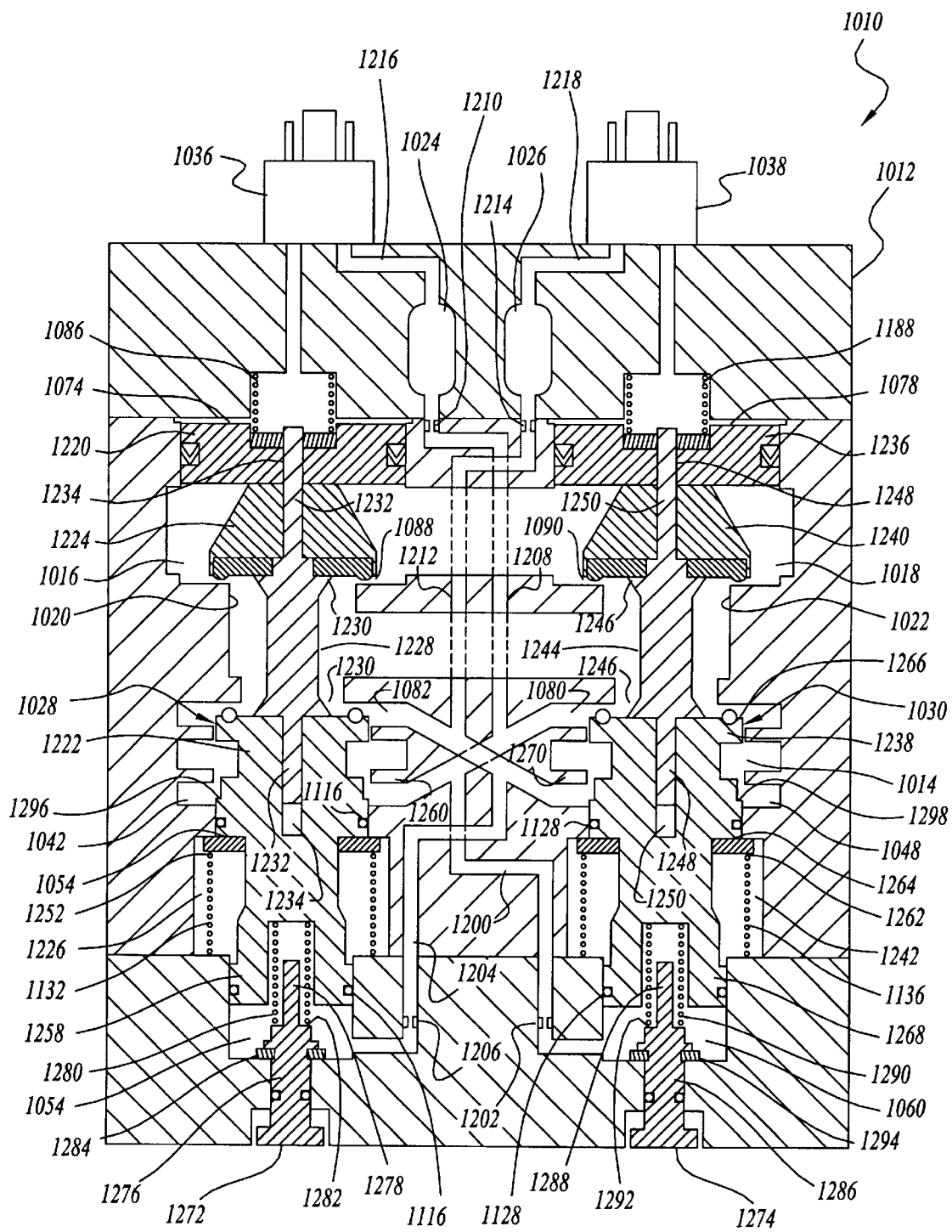
FIG. 22 is a cross-sectional view of the control valve system shown in the locked-out position.

Referring now to FIGS. 21 and 22, control valve system 1010 comprises a housing 1012 having a fluid inlet passage 1014, a fluid outlet passage 1016, a fluid exhaust passage 1018, a first valve bore 1020, a second valve bore 1022, a first fluid reservoir 1024, and a second fluid reservoir 1026. Disposed within first valve bore 1020 is a first valve member 1028, and disposed within second valve bore 1022 is a second valve member 1030. A pair of solenoid valves 1036 and 1038 is attached to housing 1012.

A plurality of fluid passages interconnect valve bores 1020 and 1022 with each other and inlet 1014, outlet 1016, exhaust 1018, reservoir 1024, reservoir 1026, solenoid valve 1036 and solenoid valve 1038. A cross passage 1080 extends between a lower portion of an intermediate chamber 1042 formed by first valve bore 1020 and an upper portion of an intermediate chamber 1048 formed by second valve bore 1022. A cross passage 1082 extends between a lower portion of chamber 1048 and an upper portion of chamber 1042. Outlet passage 1016 is in communication with exhaust passage 1018 through two ports 1088 and 1090.

A fluid passage 1200 extends between cross passage 1080 and a lower chamber 1060 formed by bore 1022. A restrictor 1202 is disposed within passage 1200 to limit the amount of fluid flow through passage 1200. A fluid passage 1204 extends between cross passage 1082 and a lower chamber 1054 formed by bore 1022. A restrictor 1206 is disposed within passage 1204 to limit the amount of fluid flow through passage 1204.

A fluid passage 1208 extends between cross passage 1080 and fluid reservoir 1024. A restrictor 1210 is disposed within passage 1208 to limit the amount of fluid flow through passage 1208. A fluid passage 1212 extends between cross passage 1082 and fluid reservoir 1026. A restrictor 1214 is disposed within passage 1212 to limit the amount of fluid flow through passage 1212. A fluid passage 1216 extends between reservoir 1024 and the input to solenoid valve 1036. A fluid passage 1218 extends between reservoir 1026 and the input to solenoid valve 1038.

Disposed within bore 1020 is valve member 1028 and disposed within bore 1022 is valve member 1030. Valve member 1028 comprises an upper piston 1220 and a lower piston 1222, both of which move together as a single unit. Upper piston 1220 is disposed within chamber 1074 and includes a valve seat 1224 which opens and closes port 1088 located between outlet passage 1016 and exhaust passage 1018. Lower piston 1222 is disposed within chamber 1042 and chamber 1054. A pair of seals 1116, such as O-ring seals, seal an intermediate chamber 1226 from chamber 1054 and chamber 1042.

An interconnecting member 1228 interconnects and partially aligns upper piston 1220 and lower piston 1222 of valve member 1028. Interconnecting member 1228 includes a pair of flanges 1230 opposingly extending from a midsection of interconnecting member 1228. Flanges 1230 engage corresponding surfaces of upper piston 1220 and lower piston 1222 to facilitate coordinated movement of upper piston 1220 and lower piston 1222. Interconnecting member 1228 further includes a pair of opposing stems 1232 received within bores 1234 formed in upper piston 1220 and lower piston 1222. Upper piston 1220, interconnecting member 1228, and lower piston 1222 are held together by a pair of return springs, which will be described below.

Likewise, valve member 1030 comprises an upper piston 1236 and a lower piston 1238, both of which move together as a single unit. Upper piston 1236 is disposed within chamber 1078 and includes a valve seat 1240 which opens and closes port 1090 located between outlet passage 1016 and exhaust passage 1018. Lower piston 1238 is disposed within chamber 1048 and chamber 1060. A pair of seals 1128, such as O-ring seals, seal an intermediate chamber 1242 from chamber 1060 and chamber 1048.

An interconnecting member 1244 interconnects and partially aligns upper piston 1236 and lower piston 1238 of valve member 1030. Interconnecting member 1244 includes a pair of flanges 1246 opposingly extending from a midsection of interconnecting member 1244. Flanges 1246 engage corresponding surfaces of upper piston 1236 and lower piston 1238 to facilitate coordinated movement of upper piston 1236 and lower piston 1238. Interconnecting member 1244 further includes a pair of opposing stems 1248 received within bores 1250 formed in upper piston 1236 and lower piston 1238. Upper piston 1236, interconnecting member 1244, and lower piston 1238 are held together by a pair of return springs, which will be described below.

Lower piston 1222 of first valve 1028 is located within chamber 1042 and includes a lower valve spring 1132 and a spring stop 1252. Lower valve spring 1132 biases spring stop 1252 against an intermediate shoulder 1254 of lower piston 1222, thereby biasing lower piston 1222 in a partially seated position against housing 1012 to restrict fluid flow between crossover passage 1082 and outlet passage 1016.

Lower piston 1222 further includes a main body portion 1256 and a lower portion 1258. Main body portion 1256 cooperates with a restrictor 1260 in chamber 1042 to restrict fluid flow between inlet passage 1014 and crossover passage 1080. However, it should be appreciated that restrictor 1260 never fully resists fluid flow into crossover passage 1080. Therefore, at least some fluid flow from inlet passage 1014 enters crossover passage 1080, thereby at least partially pressurizing many of the valve chambers and passages.

Lower piston 1238 of second valve 1030 is located within chamber 1048 and includes a lower valve spring 1136 and a spring stop 1262. Lower valve spring 1136 biases spring stop 1262 against an intermediate shoulder 1264 of lower piston 1238, thereby biasing lower piston 1238 in a partially seated position against housing 1012 to restrict fluid flow between crossover passage 1080 and outlet passage 1016.

Lower piston 1238 further includes a main body portion 1266 and a lower portion 1268. Main body portion 1266 cooperates with a restrictor 1270 in chamber 1042 to restrict fluid flow between inlet passage 1014 and crossover passage 1082. However, it should be appreciated that restrictor 1270 never fully resists fluid flow into crossover passage 1082. Therefore, at least some fluid flow from inlet passage 1014 enters crossover passage 1082, thereby at least partially pressurizing many of the valve chambers and passages. This is particularly useful when only one valve member actuates.

It should be appreciated that lower pistons 1222, 1238 function as both an inlet poppet and a sensing poppet. This arrangement enables advantages to be realized in manufacturing, assembly, and cost. That is, the integral construction of lower pistons 1222, 1238 supplies the number of valve parts required and eases the assembly of those parts within housing 1012.

Upper piston 1220 of first valve 1028 is located within chamber 1074 and includes an upper valve spring 1186. Upper valve spring 1186 biases upper piston 1220 such that valve seat 1224 is in a partially seated position against housing 1012 to restrict fluid flow through port 1088 and intermediate shoulder 1254 is against spring stop 1252. Similarly, upper piston 1236 of second valve 1030 is located within chamber 1078 and includes an upper valve spring 1188. Upper valve spring 1188 biases upper piston 1236 such that valve seat 1240 is in a partially seated position against housing 1012 to restrict fluid flow through port 1090 and intermediate shoulder 1266 is against spring stop 1264.

One feature of this invention is an anti-tiedown reset feature that includes a pair of manual reset button 1272 and 1274. However, it should be appreciated that this anti-tiedown reset feature may be accomplished using any one of a number of different methods, such as manually, hydraulically, pneumatically, mechanically, or through the use of reset solenoids. This reset function may further be controlled manually by the operator or automatically by a controller or microprocessor system.

Manual reset button 1272 is slidably disposed within housing 1012. Reset button 1272 includes a main body portion 1276 and an anti-tiedown post 1278 extending upward from main body portion 1276. Manual reset button 1272 further includes a reset button spring 1280 surrounding anti-tiedown post 1278 and engaging an intermediate shoulder 1282 formed between main body portion 1276 and anti-tiedown post 1278 on manual reset button 1272. Reset button spring 1280 further selectively engages lower portion 1258 of lower piston 1222 when manual reset button 1272 is actuated during a lock-out condition. Manual reset button 1272 still further includes a stop 1284 fixed about main body portion 1276 to slidably retain manual reset button 1272 within housing 1012.

Manual reset button 1274 is slidably disposed within housing 1012. Reset button 1274 includes a main body portion 1286 and an anti-tiedown post 1288 extending upward from main body portion 1286. Manual reset button 1274 further includes a reset button spring 1290 surrounding anti-tiedown post 1288 and engaging an intermediate shoulder 1292 formed between main body portion 1286 and anti-tiedown post 1288 on manual reset button 1274. Reset button spring 1290 further selectively engages lower portion 1268 of lower piston 1238 when manual reset button 1274 is actuated during a lock-out condition. Manual reset button 1274 still further includes a stop 1294 fixed about main body portion 1286 to slidably retain manual reset button 1274 within housing 1012.

FIGS. 21 and 22 illustrate control valve system 1010 in an initial position. It should be noted that FIGS. 21 and 22 also illustrate control valve system 1010 in a locked out position. A lockout condition occurs when at least one of the valve members 1028 or 1030 assumes the position shown in FIGS. 21 and 22. Displacement of the valves from a locked out position to a deactuated position will be described. As seen in FIGS. 21 and 22, first valve member 1028 is urged upward due to the biasing of valve spring 1132 and spring stop 1252. Spring stop 1252 pushes against intermediate shoulder 1254 until spring stop 1252 contacts housing 1012. However, as can been seen in the figures, valve seat 1224 of upper piston 1220 is not on seat against housing 1012, thus port 1088 is partially opened. Similarly, lower piston 1222 is not on seat on housing 1012, thereby enabling partial fluid flow from crossover passage 1082 to outlet passage 1016 and further to exhaust passage 1018. First valve member 1028 is held against spring stop 1252 by fluid pressure. That is, main body portion 1256 of lower piston 1222 includes an enlarged diameter section 1296. Similarly, main body portion 1266 of second valve member 1030 includes an enlarged diameter section 1298. Enlarged diameter sections 1296, 1298 are larger relative to the remaining portion of main body portions 1222, 1238, respectively. Accordingly, fluid pressure within inlet passage 1014 acts on enlarged diameter sections 1296, 1298, thereby creating a net downward force. Unless this downward force is opposed, first valve member 1028 and second valve member 1030 rest upon spring stops 1252 and 1262, respectively.

In this locked out position, partial fluid flow from inlet passage 1014 flows past restrictor 1260 and into crossover passage 1080. Such partial fluid flow further flows into passage 1200, through restrictor 1202, and into lower chamber 1060. Furthermore, partial fluid flow flows from crossover passage 1080 into passage 1208, through restrictor 1210, into fluid reservoir 1024, and to the inlet of solenoid valve 1036 through passage 1216. Similar fluid flow occurs from inlet passage 1014, through restrictor 1270, crossover passage 1082, and eventually into lower chamber 1054 and separately to solenoid valve 1038.

Figure 23:
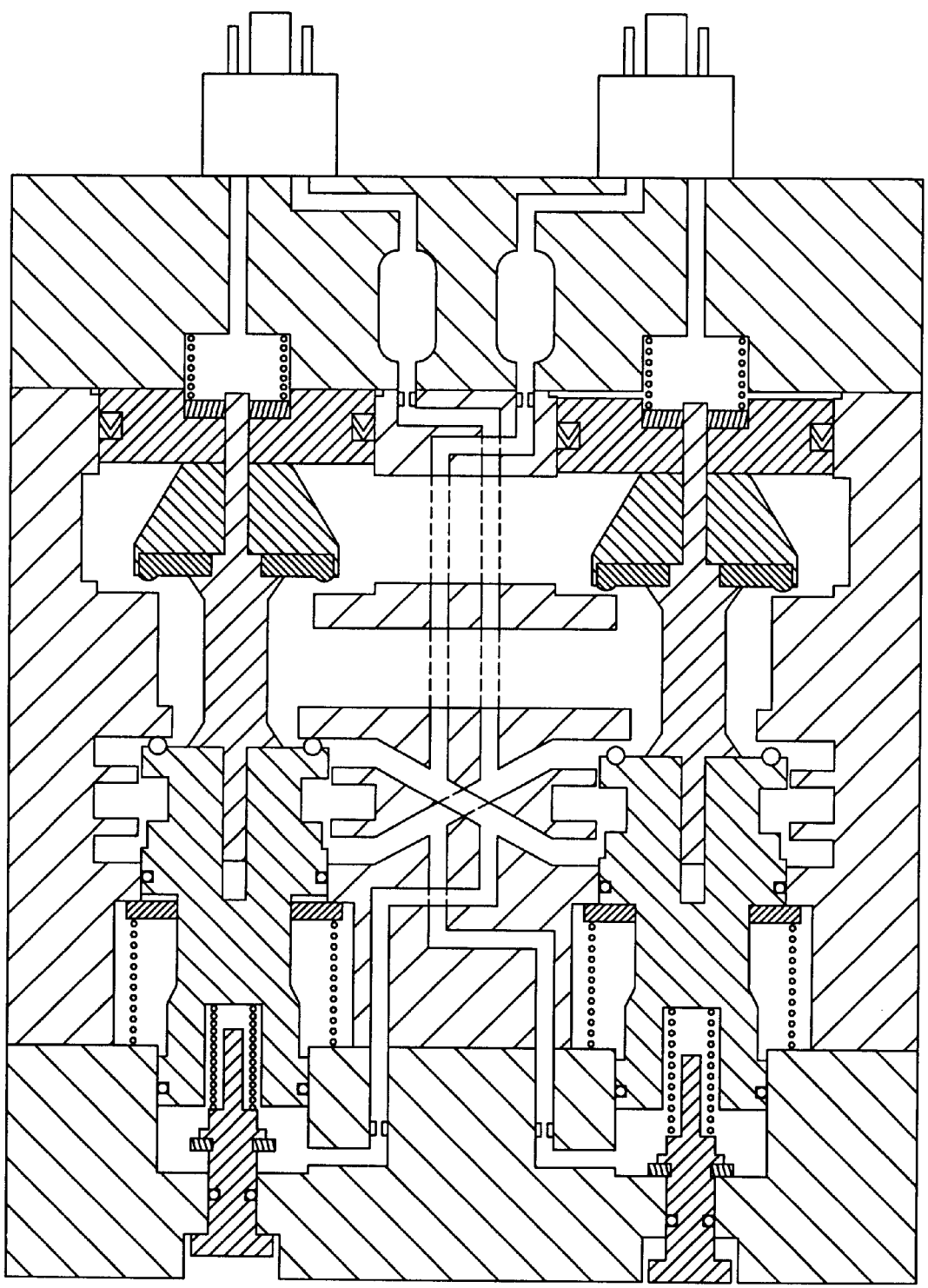
FIG. 23 is a cross-sectional view of the control valve system shown in the locked-out position with the "B" side manual reset actuated.
Figure 24:
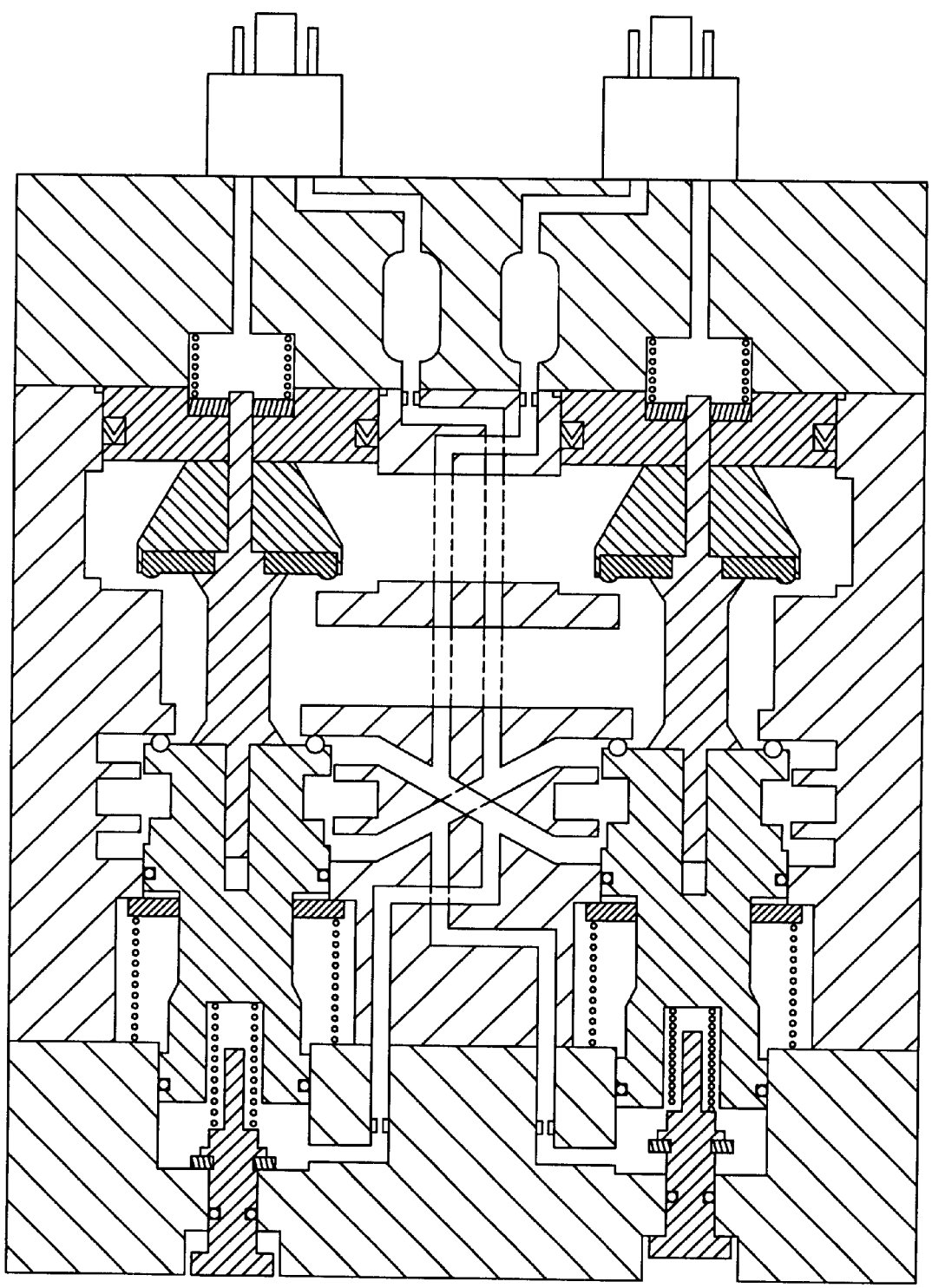
FIG. 24 is a cross-sectional view of the control valve system shown in the locked-out position with the "A" side manual reset actuated.

When it is desired to move control valve system 1010 from its initial, or locked out, position to its deactuated position shown in FIGS. 23 and 24, manual pressure is applied to manual reset button 1272 (see FIG. 23) thereby sliding manual reset button 1272 upward. This upward movement compresses reset button spring 1280 between manual reset button 1272 and lower portion 1258 of lower piston 1222. The biasing force created by this compression forces or drives lower piston 1222, interconnecting member 1228, and upper piston 1220 upward, thereby fully seating lower piston 1222 against housing 1012 to prevent fluid flow from crossover passage 1082 to outlet passage 1016. Note that if solenoid valve 1036 is energized, the upward biasing force on lower piston 1222, interconnecting member 1228, and upper piston 1220 is off set by a downward force applied by pressurized fluid output by solenoid valve 1038.

Referring to FIG. 21, first valve member 1028 would be positioned in its lowermost position. Accordingly, fluid pressure from inlet passage 1014 can build within crossover passage 1082, passage 1204, lower chamber 1054 and further within passage 1212, reservoir 1026, and the inlet to solenoid valve 1038. In this position, the fluid pressure within lower chamber 1054 acting on lower piston 1222 forces first valve member 1028 upward against the opposing force created by the equal fluid pressure acting on enlarged diameter section 1296 of lower piston 1222 so as to maintain lower piston 1222 seated against housing 1012.

Further to this end, manual pressure is applied to manual reset button 1274 (see FIG. 24) thereby sliding manual reset button 1274 upward. This upward movement compresses reset button spring 1290 between manual reset button 1274 and lower portion 1268 of lower piston 1238. The biasing force created by this compression forces or drives lower piston 1238, interconnecting member 1244, and upper piston 1236 upward, thereby fully seating lower piston 1238 against housing 1012 to prevent fluid flow from crossover passage 1080 to outlet passage 1016. Note that if solenoid valve 1038 is energized, the upward biasing force on lower piston 1238, interconnecting member 1244, and upper piston 1236 is off set by a downward force applied by pressurized fluid output by solenoid valve 1036.

Referring to FIG. 21, second valve member 1030 would be positioned in the bottom position. Accordingly, fluid pressure from inlet passage 1014 can build within crossover passage 1080, passage 1200, lower chamber 1060 and further within passage 1208, reservoir 1024, and the inlet to solenoid valve 1036. In this position, the fluid pressure within lower chamber 1060 acting on lower piston 1238 forces second valve member 1030 upward against the opposing force created by the equal fluid pressure acting on enlarged diameter section 1298 of lower piston 1238 so as to maintain lower piston 1238 seated against housing 1012.

Figure 25:
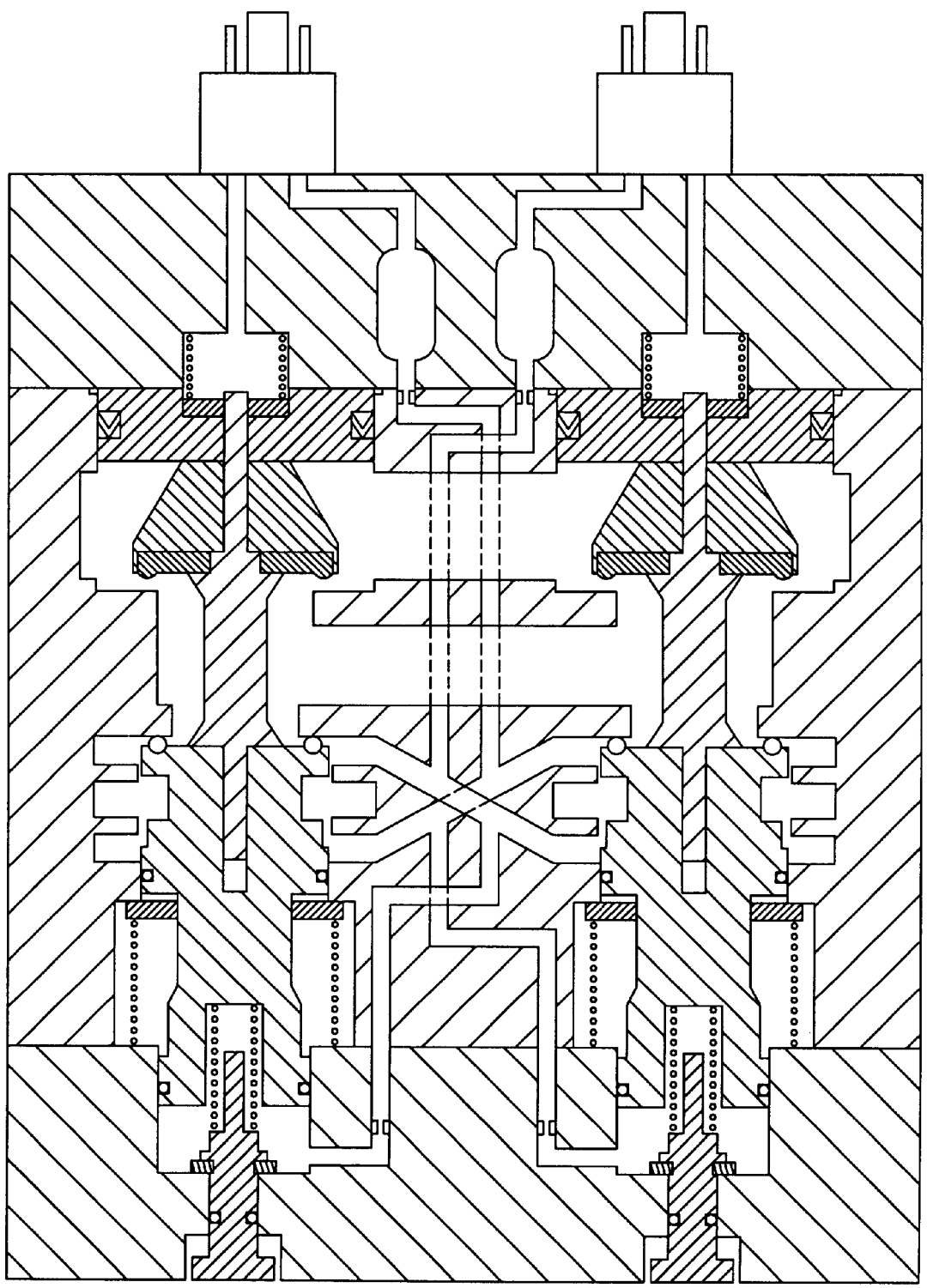
FIG. 25 is a cross-sectional view of the control valve system shown in its normal position ready for operation.

Finally, control valve system 1010 achieves a normal position, which is ready for operation, as seen in FIG. 25, wherein crossover passages 1080, 1082; lower chambers 1054, 1060; and the inlet to solenoid valves 1036, 1038 are fully pressurized.

Figure 26:
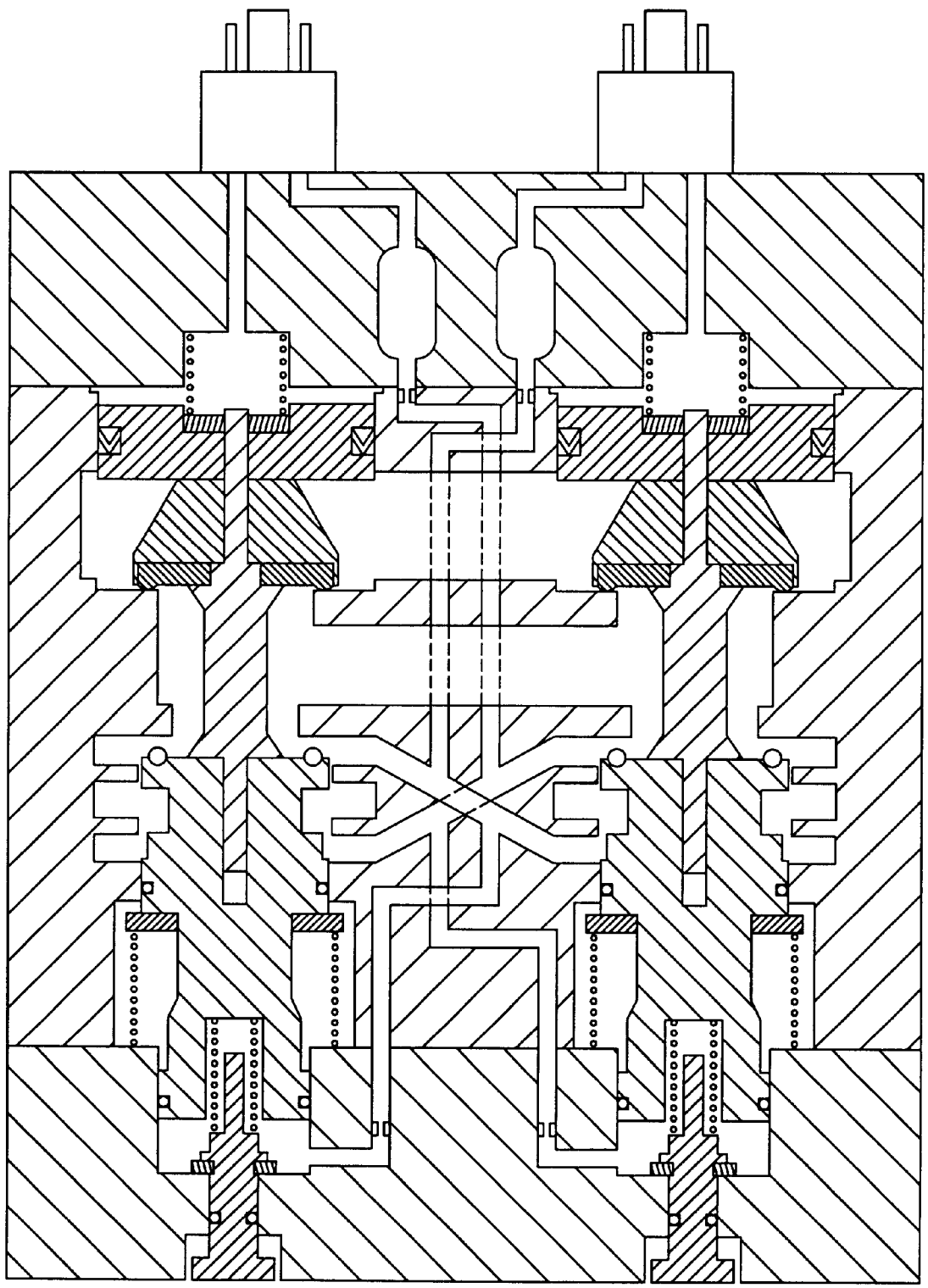
FIG. 26 is a cross-sectional view of the control valve system shown in its fully operated position with the outlet being fully pressurized.

During operation as seen in FIG. 26, solenoid valves 1036, 1038 are both actuated to supply pressurized fluid against upper pistons 1220, 1236, thereby driving first valve member 1028 and second valve member 1030 downward to overcome the biasing force acting on spring stops 1252, 1262. This action enables fluid flow from inlet passage 1014, through restrictors 1260, 1270 and crossover passages 1080, 1082 and finally into outlet passage 1016. This action further closes ports 1088, 1090 to prevent fluid flow from outlet passage 1016 to exhaust passage 1018. Referring to FIG. 21, first valve member 1028 and second valve member 1030 would be positioned in the bottom position.

As best illustrated in FIGS. 23 and 24, in a particular feature of the present invention is that each manual reset button 1272, 1274 must be actuated to reset control valve system 1010. Moreover, these manual reset buttons 1272, 1274 can not be permanently locked or tied down or the valve system will not operate. That is, anti-tiedown stems 1278, 1288 are sufficiently sized such that if manual reset button 1272, 1274 are tied down, the anti-tiedown stems 1278, 1288 will engage lower pistons 1222, 1238, thereby preventing movement of first valve member 1028 and second valve member 1030 to prevent use of control valve system 1010.

Figure 27:
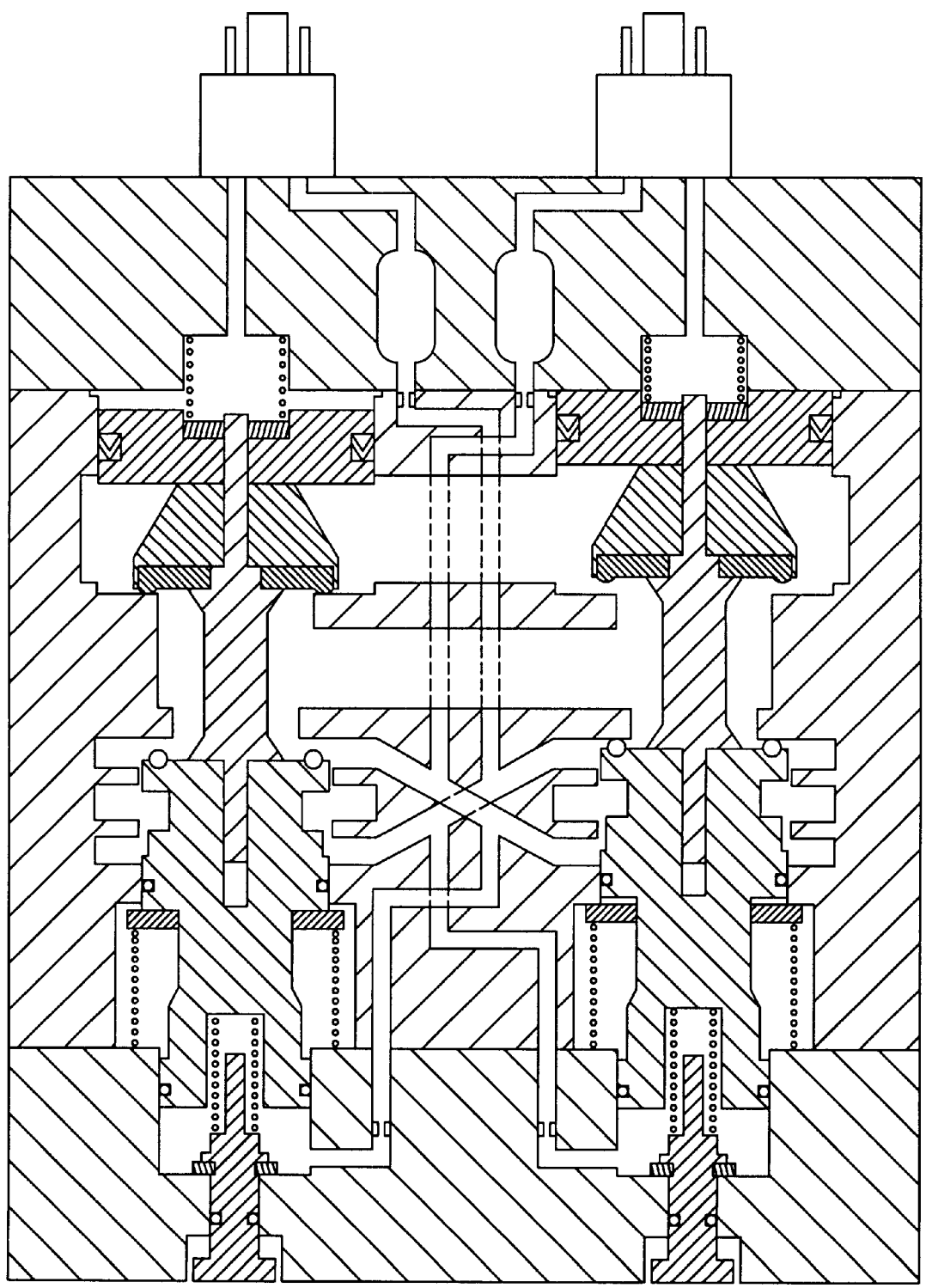
FIG. 27 is a cross-sectional view of the control valve system shown in an abnormal position.
Figure 28:
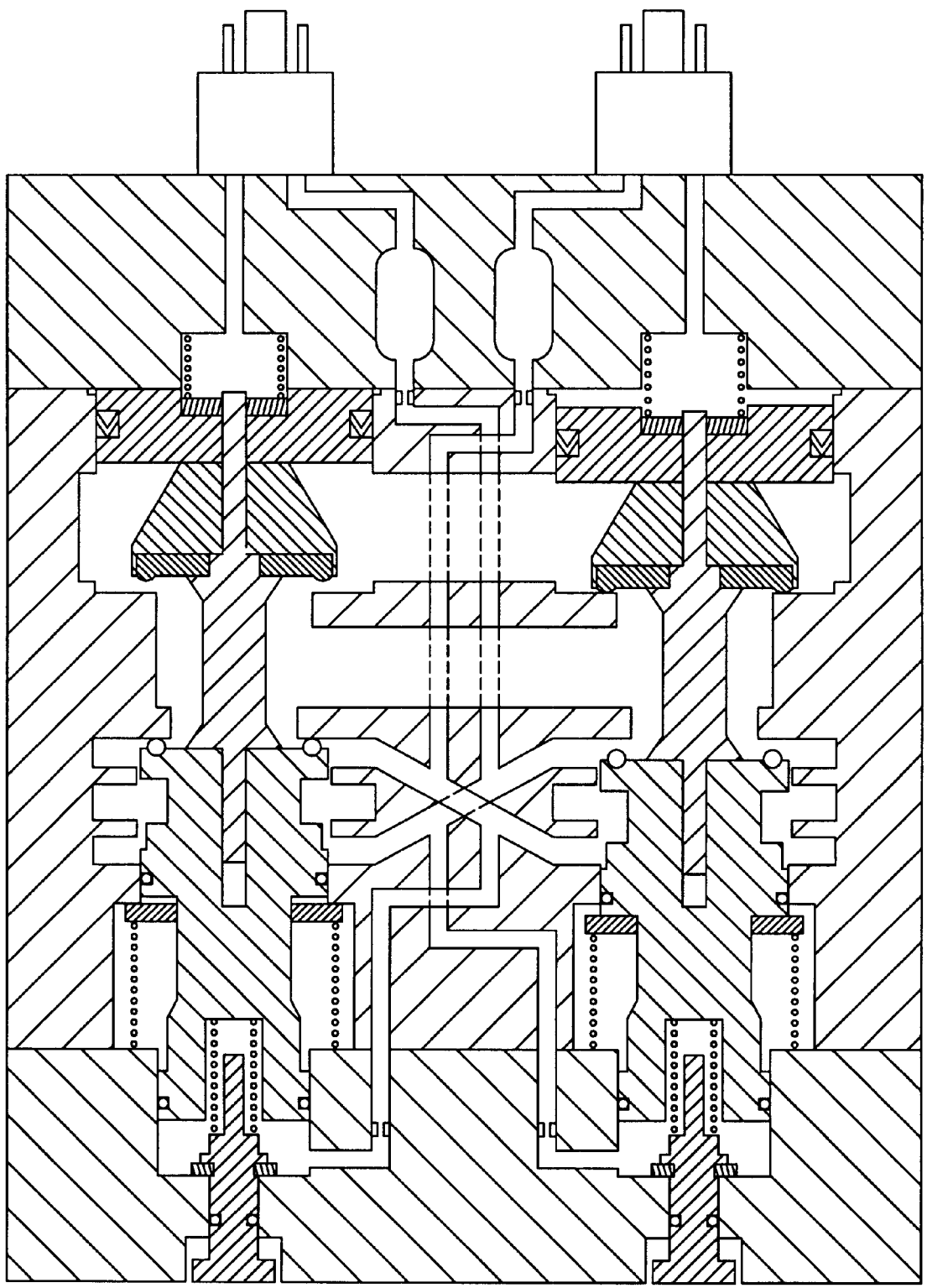
FIG. 28 is a cross-sectional view of the control valve system shown wherein the pilot pressure to solenoid "B" and return piston "A" are exhausted.

FIG. 27 illustrates the event where solenoid valve 1038 fails to actuate or solenoid valve 1036 fails to deactuate during operation. In this case, lower piston 1238 of second valve member 1030 remains on seat with housing 1012 due to the fluid pressure within lower chamber 1060. However, the fluid pressure acting downward on upper piston 1220 of first valve member 1028 forces first valve member 1028 downward against spring stop 1252, thereby opening crossover passage 1082 to outlet passage 1016. However, outlet passage 1016 is vented to exhaust passage 1018 through port 1090. The opposite occurs when solenoid valve 1036 fails to actuate or solenoid valve 1038 fails to deactuate during operation as shown in FIG. 28.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve system comprising:
   a housing defining an inlet, an outlet and an exhaust;
   a first passage extending between said inlet and said outlet;
   a second passage extending between said outlet and said exhaust;
   a first plurality of valves disposed within said first passage, each of said first plurality of valves being movable between a deactuated position where said first passage is closed, an actuated position where said first passage is open, and an intermediate position where said first passage is partially open;
   a second plurality of valves disposed within said second passage, each of said second plurality of valves being movable between a deactuated position where said second passage is open, an actuated position where said second passage is closed, and an intermediate position where said second passage is partially open; and a plurality of reset members selectively engageable with said first plurality of valves, said plurality of reset members operable to move said first plurality of valves to said deactuated position when a pressure is applied to said plurality of reset members, said plurality of reset members each having an anti-tiedown stem extending therefrom engageable with said first plurality of valves to prevent operation of the control valve system if any of said plurality of reset members is tied down.

2. The control valve system according to claim 1 wherein each of said plurality of reset members comprises a biasing member, said biasing member biasing said corresponding reset member to a disengaged position.

3. The control valve system according to claim 1, further comprising:

a plurality of return springs biasing said plurality of first valve members to said intermediate position and said plurality of second valve members to said intermediate position.

4. The control valve system according to claim 3 wherein each of said plurality of first valves comprises a first surface and an opposing second surface, said second surface being larger than said first surface to receive fluid pressure from said inlet and force each of said plurality of first valves against said plurality of return springs and into said intermediate position.

5. The control valve system according to claim 1, further comprising:

a restrictor disposed between said inlet and said first passage to limit the amount of fluid flow therethrough.

6. A circuit for operating a control valve system comprising:

an inlet, an outlet, and an exhaust;

a first passage extending between said inlet and said outlet;

a second passage extending between said outlet and said exhaust;

a first main valve moveable between a deactuated position where said first passage is closed, an actuated position where said second passage closed, and an intermediate position where said first and second passages are partially open;

a second main valve moveable between a deactuated position where said first passage is closed, an actuated position where said second passage is closed, and an intermediate position where said first and second passages are partially open; and a reset member selectively engageable with said first main valve, said reset member operable to move said first main valve to said deactuated position when a force is applied to said reset member, said reset member having an anti-tiedown stem extending therefrom engageable with said first main valve to prevent operation of the circuit if said reset member is tied down.

7. The circuit of claim 6 comprising:

a first pilot valve for operating said first main valve; and a second pilot valve for operating said second main valve.

8. The circuit according to claim 7 wherein said reset member comprises a biasing member, said biasing member biasing said reset member to a disengaged position, wherein said first main valve is prevented from moving to said deactuated position if said first pilot value is actuated.

9. The circuit according to claim 6, further comprising:

a return spring biasing said first main valve to said intermediate position and said second main valve to said intermediate position.

10. The circuit according to claim 9 wherein said first main valve is moveable to said intermediate position in response to a fluid pressure.

11. The circuit according to claim 6, further comprising:

a resistor disposed between said inlet and said first passage to limit the amount of fluid flow therethrough.

12. A control valve system comprising:

a housing defining an inlet, an outlet and an exhaust;

a first passage extending between said inlet and said outlet;

a second passage extending between said outlet and said exhaust;

a plurality of inlet poppets disposed within said first passage, each of said inlet poppets being movable between a deactuated position where said first passage is closed, an actuated position where said first passage is open, and an intermediate position where said first passage is partially open;

a plurality of exhaust poppets disposed within said second passage, each of said exhaust poppets being movable between a deactuated position where said second passage is open, an actuated position where said second passage is closed, and an intermediate position where said second passage is partially open, each of said inlet poppets acting as both a sensing poppet and an inlet poppet; and a plurality of reset members selectively engageable with said inlet poppets, said plurality of reset members operable to move said inlet poppets to said deactuated position when a pressure is applied to said plurality of reset members, said plurality of reset members each having an anti-tiedown stem extending therefrom engageable with said inlet poppets to prevent operation of the control valve system if any of said plurality of reset members is tied down.

13. The control valve system according to claim 12 wherein each of said plurality of reset members comprises a biasing member, said biasing member biasing said corresponding reset member to a disengaged position.

14. The control valve system according to claim 12, further comprising:

a plurality of return springs biasing said plurality of inlet poppets to said intermediate position and said plurality of exhaust poppets to said intermediate position.

15. The control valve system according to claim 14 wherein each of said plurality of inlet poppets comprises a first surface and an opposing second surface, an area of said second surface being larger than an area of said first surface to receive fluid pressure from said inlet and force each of said plurality of inlet poppets against said plurality of return springs and into said intermediate position.

16. The control valve system according to claim 12, further comprising:

a restrictor disposed between said inlet and said first passage to limit the amount of fluid flow therethrough.

* * * * *